(12) United States Patent
Xie et al.

(10) Patent No.: US 12,294,483 B2
(45) Date of Patent: May 6, 2025

(54) FAULT RECOVERY PLAN DETERMINING METHOD, APPARATUS, AND SYSTEM, AND COMPUTER STORAGE MEDIUM

(71) Applicant: HUAWEI TECHNOLOGIES CO., LTD., Guangdong (CN)

(72) Inventors: Yuming Xie, Nanjing (CN); Ye Li, Shenzhen (CN); Juchang Li, Nanjing (CN); Yunpeng Gao, Nanjing (CN); Yanxiang Hou, Beijing (CN); Yancheng Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/302,629

(22) Filed: Apr. 18, 2023

(65) Prior Publication Data

US 2023/0318906 A1   Oct. 5, 2023

Related U.S. Application Data

(63) Continuation of application No. PCT/CN2021/124377, filed on Oct. 18, 2021.

(30) Foreign Application Priority Data

Oct. 20, 2020  (CN) .......................... 202011123661.5
Dec. 31, 2020  (CN) .......................... 202011622270.8

(51) Int. Cl.
*G06F 15/177* (2006.01)
*H04L 41/0604* (2022.01)
(Continued)

(52) U.S. Cl.
CPC ...... *H04L 41/0631* (2013.01); *H04L 41/0627* (2013.01); *H04L 41/16* (2013.01)

(58) Field of Classification Search
CPC .. H04L 41/0631; H04L 41/0627; H04L 41/16
(Continued)

(56) References Cited

U.S. PATENT DOCUMENTS

| | | | |
|---|---|---|---|
| 11,442,652 B1* | 9/2022 | Dailey | H04L 67/1097 |
| 2019/0294490 A1* | 9/2019 | Zhang | G06F 11/0793 |
| 2023/0161637 A1* | 5/2023 | Soualhia | H04L 41/147 |
| | | | 718/102 |

FOREIGN PATENT DOCUMENTS

| | | |
|---|---|---|
| CN | 103473409 B | 6/2016 |
| CN | 108090567 A | 5/2018 |

(Continued)

OTHER PUBLICATIONS

Pernici et al., "Automatic Learning of Repair Strategies for Web Services," Proceedings of the Fifth European Conference on Web Services, Nov. 1, 2007, pp. 119-128.
(Continued)

*Primary Examiner* — Alan S Chou
(74) *Attorney, Agent, or Firm* — Fish & Richardson P.C.

(57) ABSTRACT

This application discloses a fault recovery plan determining method, apparatus, and system, and a computer storage medium, and belongs to the field of network technologies. First, a control device obtains a similar known fault that is in a plurality of known faults and whose fault root cause and a fault root cause of a target fault in a network meet a similarity condition. Then, the control device obtains a fault recovery plan corresponding to the similar known fault. The control device determines, based on the fault recovery plan corresponding to the similar known fault, a fault recovery plan corresponding to the target fault.

17 Claims, 11 Drawing Sheets

(51) Int. Cl.
*H04L 41/0631* (2022.01)
*H04L 41/16* (2022.01)

(58) Field of Classification Search
USPC .......................................................... 709/220
See application file for complete search history.

(56) References Cited

FOREIGN PATENT DOCUMENTS

| CN | 105467975 B | 8/2018 |
| CN | 111082401 A | 4/2020 |
| CN | 111209472 A | 5/2020 |

OTHER PUBLICATIONS

Extended European Search Report in European Appln No. 21881956.3, dated Jan. 24, 2024, 10 pages.
International Search Report and Written Opinion in International Appln. No. PCT/CN2021/124377, mailed on Jan. 14, 2022, 17 pages (with English translation).

* cited by examiner

FAULT RECOVERY PLAN DETERMINING METHOD, APPARATUS, AND SYSTEM, AND COMPUTER STORAGE MEDIUM

CROSS-REFERENCE TO RELATED APPLICATIONS

This application is a continuation of International Application No. PCT/CN2021/124377, filed on Oct. 18, 2021, which claims priority to Chinese Patent Application No. 202011622270.8, filed on Dec. 31, 2020, which claims priority to Chinese Patent Application No. 202011123661.5, filed on Oct. 20, 2020. All of the aforementioned patent applications are hereby incorporated by reference in their entireties.

TECHNICAL FIELD

This application relates to the field of network technologies, and in particular, to a fault recovery plan determining method, apparatus, and system, and a computer storage medium.

BACKGROUND

A network fault means that a network cannot provide normal services or quality of services is poor due to a hardware problem, a software problem, a network attack, or the like. After a network fault occurs, a conventional operation and maintenance mode is used to perform fault recovery. In this process, a fault recovery plan needs to be provided based on experience and manual determining, resulting in inadequate automation and low efficiency.

Currently, a series of expert rules are formulated based on expert experience and fault cases on a live network. The expert rule includes a fault and a fault recovery plan corresponding to the fault. When a network fault occurs, a management device determines, based on the formulated expert rule, a fault recovery plan corresponding to the fault, and then implements the fault recovery plan to rectify the network fault. This shortens time consumed for a network device to change from a faulty state to a working state. The time consumed for the network device to change from the faulty state to the working state may also be referred to as mean time to recovery (MTTR).

However, currently, the expert rule usually specifies the fault recovery plan corresponding to the fault in a hard coding manner, and therefore, only the fault included in the expert rule can be processed, and a range of faults that can be processed is limited.

SUMMARY

This application provides a fault recovery plan determining method, apparatus, and system, and a computer storage medium, to resolve a problem that a range of faults that can be processed based on an expert rule is limited currently.

According to a first aspect, a fault recovery plan determining method is provided. The method includes: A control device obtains a similar known fault that is in a plurality of known faults and whose fault root cause and a fault root cause of a target fault in a network meet a similarity condition. The control device obtains a fault recovery plan corresponding to the similar known fault. The control device determines, based on the fault recovery plan corresponding to the similar known fault, a fault recovery plan corresponding to the target fault.

In this application, the control device can determine, based on the fault recovery plan corresponding to the similar known fault of the target fault in the network, the fault recovery plan corresponding to the target fault. In other words, regardless of whether the target fault is a known fault, the fault recovery plan corresponding to the target fault can be determined, provided that the similar known fault whose fault root cause and the fault root cause of the target fault meet the similarity condition can be found from the known faults. This expands a range of faults that can be processed. In addition, one fault in the network may cause a plurality of cascading faults, and the fault root cause can reflect an underlying cause of the fault. Therefore, the similar known fault of the fault in the network is searched for based on the fault root cause. There is a high matching degree between the found similar known fault and the fault, and there is also a high probability that the fault recovery plan corresponding to the similar known fault is applicable to the fault, so that reliability of the determined fault recovery plan is high.

Optionally, the fault root cause is represented by a fault root cause feature, the fault root cause feature includes a fault root cause object and a fault root cause event, the fault root cause event is an abnormal event causing a fault, the fault root cause object is used to indicate a type of a fault root cause network entity, and the fault root cause network entity is a network entity to which the fault root cause event belongs. The fault root cause object may be understood as an ontology of a fault root cause network entity, and the fault root cause network entity may be understood as an instantiation of the fault root cause object. A type of the fault root cause object includes a device type, an interface type, a protocol type, or a service type.

Optionally, the fault root cause network entity is a physical interface, and the fault root cause feature further includes one or more of an intermittent interface disconnection indication of the fault root cause network entity, an interface suspension indication of the fault root cause network entity, a packet receiving/sending state of the fault root cause network entity, an interface protocol status of the fault root cause network entity, or a physical interface status of a device in which the fault root cause network entity is located. Alternatively, the fault root cause network entity is a BGP peer, and the fault root cause feature further includes a BGP route flapping indication of the fault root cause network entity and/or a physical interface status of a device in which the fault root cause network entity is located. Alternatively, the fault root cause feature is not limited to the type of the fault root cause network entity, and further includes a physical interface status of a device in which the fault root cause network entity is located.

In a first case, an implementation process in which a control device obtains a similar known fault that is in a plurality of known faults and whose fault root cause and a fault root cause of a target fault in a network meet a similarity condition includes: The control device obtains fault root cause features of the plurality of known faults. For each of the plurality of known faults, the control device calculates a similarity between the fault root cause of the target fault and a fault root cause of the known fault based on a fault root cause feature of the target fault and the fault root cause feature of the known fault. The control device determines, based on the similarities between the fault root cause of the target fault and the fault root causes of the plurality of known faults, the similar known fault that is in the plurality of known faults and whose fault root cause and the fault root cause of the target fault meet the similarity condition.

In a possible implementation, an implementation process in which the control device determines, based on the similarities between the fault root cause of the target fault and the fault root causes of the plurality of known faults, the similar known fault that is in the plurality of known faults and whose fault root cause and the fault root cause of the target fault meet the similarity condition includes: The control device determines a known fault that is in the plurality of known faults and whose fault root cause and the fault root cause of the target fault have a similarity greater than a similarity threshold as the similar known fault.

In this implementation, a similar fault of the target fault is searched for from the known faults based on the similarity threshold, and accuracy of the determined similar fault is high, so that reliability of a fault recovery plan corresponding to the determined target fault is high.

In another possible implementation, the control device sorts the similarities between the fault root cause of the target fault and the fault root causes of the plurality of known faults, and uses n known faults whose fault root causes and the fault root cause of the target fault have highest similarities as similar known faults of the target fault, where n is a positive integer.

In this implementation, the similar known fault of the target fault can always be found from the known faults, so that the fault recovery plan corresponding to the target fault can always be determined, and a range of faults that can be processed is large.

In still another possible implementation, a management device uses, as the similar known faults of the target fault, known faults whose fault root causes and the fault root cause of the target fault have similarities greater than the similarity threshold in the plurality of known faults and that are first m known faults in descending order of similarities between the fault root causes and the fault root cause of the target fault, where m is a positive integer.

In this implementation, the known fault whose fault root cause and the fault root cause of the target fault have the similarity greater than the similarity threshold can be screened, so that accuracy of the determined similar fault can be ensured, and a quantity of the determined similar faults can be limited, to reduce a subsequent calculation amount.

Optionally, an implementation process in which the control device calculates a similarity between the fault root cause of the target fault and a fault root cause of the known fault based on a fault root cause feature of the target fault and the fault root cause feature of the known fault includes: The control device inputs the fault root cause feature of the target fault and the fault root cause feature of the known fault into a similarity model, to obtain the similarity that is between the fault root cause of the target fault and the fault root cause of the known fault and that is output by the similarity model. The similarity model is obtained through training based on fault root cause features of a plurality of sample faults. The sample fault is marked with a category label. Sample faults marked with a same category label correspond to a same fault recovery plan.

Optionally, the control device obtains the similarity model through training by using the fault root cause features of the plurality of sample faults.

Optionally, the control device may further input fault root cause features of a plurality of sample fault pairs into the similarity model in batches, to obtain a similarity that is between fault root causes of each sample fault pair and that is output by the similarity model. The plurality of sample fault pairs include a first-category sample fault pair and a second-category sample fault pair. The first-category sample fault pair includes two sample faults marked with a same category label, and the second-category sample fault pair includes two sample faults marked with different category labels. The control device determines the similarity threshold based on the similarities between the fault root causes of the plurality of sample fault pairs.

Alternatively, the control device receives the similarity model and/or the similarity threshold that are/is from a training device. The training device is an upper-layer device of the control device.

In this application, the training device uniformly trains the similarity model and/or determines the similarity threshold, so that all control devices managed by the training device share the similarity model and/or the similarity threshold, to reduce a calculation amount of the control device.

Optionally, the control device may further receive a fault root cause feature set from the training device. The fault root cause feature set includes correspondences between the plurality of known faults and the fault root cause features. In this case, an implementation process in which the control device obtains fault root cause features of the plurality of known faults includes: The control device obtains the fault root cause features of the plurality of known faults based on the fault root cause feature set.

Optionally, the control device may further send an identifier of the target fault and the fault root cause feature of the target fault to the training device, so that the training device adds a correspondence between the target fault and the fault root cause feature of the target fault to the fault root cause feature set, to obtain an updated fault root cause feature set.

In this application, the control device may report a fault root cause feature of a live-network fault to the training device in real time, so that the training device automatically updates the fault root cause feature set, to expand a range of faults that can be processed.

Optionally, when a fault occurs in the network, the control device obtains an abnormal event generated in the network. The control device determines a fault root cause feature of the fault based on the abnormal event generated in the network. The target fault may be any fault in the network.

In a second case, an implementation process in which the control device obtains a similar known fault that is in a plurality of known faults and whose fault root cause and a fault root cause of a target fault in a network meet a similarity condition includes: the control device receives similar fault information that corresponds to the target fault and that is from an analysis device. The similar fault information includes an identifier of the target fault and a similar fault list. The similar fault list includes one or more similar known faults of the target fault.

Optionally, the similar fault information further includes a fault root cause feature of the target fault.

In the second case, the analysis device determines the similar known fault of the target fault from the plurality of known faults, and then sends information about the similar known fault to the control device. For a manner in which the analysis device determines the similar known fault of the target fault, refer to the manner in which the control device determines the similar known fault of the target fault in the first case. Details are not described herein again in this application.

Optionally, an implementation process in which the control device determines, based on the fault recovery plan corresponding to the similar known fault, a fault recovery plan corresponding to the target fault includes: The control device evaluates, based on a network configuration of the network, feasibility of the fault recovery plan corresponding to the similar known fault. The network configuration includes a networking topology and/or device data. The device data includes one or more of management plane data, data plane data, or control plane data. The control device determines one or more of feasible fault recovery plans as the fault recovery plan corresponding to the target fault.

Optionally, an implementation process in which the control device determines one or more of feasible fault recovery plans as the fault recovery plan corresponding to the target fault includes: In response to a case in which the plurality of fault recovery plans are feasible, the control device separately evaluates, based on the network configuration of the network, degrees of impact of the plurality of fault recovery plans on a service running in the network. The control device determines a fault recovery plan that is in the plurality of fault recovery plans and that has a minimum degree of impact on the service running in the network as the fault recovery plan corresponding to the target fault.

In this application, the control device determines, as the fault recovery plan corresponding to the target fault, a fault recovery plan that is in the fault recovery plans corresponding to the similar known faults of the target fault and that has a minimum degree of impact on the service running in the network, so that the target fault can be resolved, and impact on the service running in the network can be minimized, to improve network running reliability and stability.

Optionally, the control device may further determine a target network device of a to-be-executed plan in the network based on the target fault and the fault recovery plan corresponding to the target fault. The control device sends a plan execution instruction to the target network device. The plan execution instruction is used to instruct the target network device to execute the fault recovery plan corresponding to the target fault. The plan execution instruction includes the fault recovery plan corresponding to the target fault.

In this application, after determining the fault recovery plan corresponding to the target fault, the control device may further distribute the fault recovery plan to a related network device that needs to execute the fault recovery plan in the network, to implement end-to-end fault recovery.

Optionally, the control device may further send a plan execution rollback instruction to the target network device. The plan execution rollback instruction is used to instruct the target network device to be restored to a state before the fault recovery plan corresponding to the target fault is executed.

Optionally, in response to receiving a rollback trigger instruction, the control device sends the plan execution rollback instruction to the target network device.

In this application, after sending the plan execution instruction to the target network device, the control device may further send the plan execution rollback instruction to the target network device, to instruct the target network device to be restored to the state before the fault recovery plan is executed. This implements a state rollback function of the network device. If the network device executes an improper fault recovery plan, this function can quickly restore the network device to an original state, to improve network running reliability.

Optionally, the control device receives a fault recovery plan set from the training device. The fault recovery plan set includes correspondences between the plurality of known faults and fault recovery plans. An implementation process in which the control device obtains a fault recovery plan corresponding to the similar known fault includes: The control device obtains, based on the fault recovery plan set, the fault recovery plan corresponding to the similar known fault.

Optionally, the control device sends the identifier of the target fault and the fault recovery plan corresponding to the target fault to the training device, so that the training device adds a correspondence between the target fault and the fault recovery plan corresponding to the target fault to the fault recovery plan set, to obtain an updated fault recovery plan set.

In this application, the control device may report a fault recovery plan corresponding to the live-network fault to the training device in real time, so that the training device automatically updates a fault recovery plan set, to expand a range of faults that can be processed. In addition, a fault recovery plan corresponding to the fault does not need to be manually summarized and a hard coding manner is used. This improves flexibility of expansion of the fault recovery plan and reduces maintenance difficulty.

According to a second aspect, a fault recovery plan determining method is provided. The method includes: An analysis device obtains a similar known fault that is in a plurality of known faults and whose fault root cause and a fault root cause of a target fault in a network meet a similarity condition. The analysis device sends similar fault information corresponding to the target fault to a control device. The similar fault information includes an identifier of the target fault and a similar fault list. The similar fault list includes one or more similar known faults of the target fault. The similar fault information is used by the control device to determine a fault recovery plan corresponding to the target fault.

Optionally, the similar fault information further includes a fault root cause feature of the target fault.

Optionally, an implementation process in which an analysis device obtains a similar known fault that is in a plurality of known faults and whose fault root cause and a fault root cause of a target fault in a network meet a similarity condition includes: The analysis device obtains fault root cause features of the plurality of known faults. For each of the plurality of known faults, the analysis device calculates a similarity between the fault root cause of the target fault and a fault root cause of the known fault based on a fault root cause feature of the target fault and the fault root cause feature of the known fault. The analysis device determines, based on the similarities between the fault root cause of the target fault and the fault root causes of the plurality of known faults, the similar known fault that is in the plurality of known faults and whose fault root cause and the fault root cause of the target fault meet the similarity condition.

Optionally, an implementation process in which the analysis device determines, based on the similarities between the fault root cause of the target fault and the fault root causes of the plurality of known faults, the similar known fault that is in the plurality of known faults and whose fault root cause and the fault root cause of the target fault meet the similarity condition includes: The analysis device determines a known fault that is in the plurality of known faults and whose fault root cause and the fault root cause of the target fault have a similarity greater than a similarity threshold as the similar known fault.

Optionally, an implementation process in which the analysis device calculates a similarity between the fault root cause of the target fault and a fault root cause of the known fault based on a fault root cause feature of the target fault and the fault root cause feature of the known fault includes: The analysis device inputs the fault root cause feature of the target fault and the fault root cause feature of the known fault into a similarity model, to obtain the similarity that is between the fault root cause of the target fault and the fault root cause of the known fault and that is output by the similarity model. The similarity model is obtained through training based on fault root cause features of a plurality of sample faults marked with a category label. Sample faults marked with a same category label correspond to a same fault recovery plan.

According to a third aspect, a fault recovery plan determining method is provided. The method includes: A training device obtains a similarity model. The similarity model is obtained through training based on fault root cause features of a plurality of sample faults. The sample fault is marked with a category label. Sample faults marked with a same category label correspond to a same fault recovery plan. The training device sends the similarity model to an analysis device, so that the analysis device determines a similar known fault of a target fault that occurs in a network. The similar known fault is used to determine a fault recovery plan corresponding to the target fault.

Optionally, an implementation process in which a training device obtains a similarity model includes: The training device obtains the similarity model through training by using the fault root cause features of the plurality of sample faults.

Optionally, the training device may further input fault root cause features of a plurality of sample fault pairs into the similarity model in batches, to obtain a similarity that is between fault root causes of each sample fault pair and that is output by the similarity model. The plurality of sample fault pairs include a first-category sample fault pair and a second-category sample fault pair. The first-category sample fault pair includes two sample faults marked with a same category label, and the second-category sample fault pair includes two sample faults marked with different category labels. The training device determines the similarity threshold based on the similarities between the fault root causes of the plurality of sample fault pairs. The training device sends the similarity threshold to the analysis device.

Optionally, the training device may further send a fault root cause feature set to the analysis device. The fault root cause feature set includes correspondences between the plurality of known faults and fault root cause features. The training device may further send a fault recovery plan set to a control device. The fault recovery plan set includes correspondences between the plurality of known faults and fault recovery plans.

Optionally, the training device may further receive an identifier of the target fault, a fault root cause feature of the target fault, and the fault recovery plan corresponding to the target fault that are from the control device. The training device adds a correspondence between the target fault and the fault root cause feature of the target fault to the fault root cause feature set, to obtain an updated fault root cause feature set, and adds a correspondence between the target fault and the fault recovery plan corresponding to the target fault to the fault recovery plan set, to obtain an updated fault recovery plan set.

According to a fourth aspect, a control device is provided. The control device includes a plurality of functional modules. The plurality of functional modules interact with each other to implement the method according to the first aspect and the implementations of the first aspect. The plurality of functional modules may be implemented based on software, hardware, or a combination of software and hardware, and the plurality of functional modules may be randomly combined or divided based on a specific implementation.

According to a fifth aspect, an analysis device is provided. The analysis device includes a plurality of functional modules. The plurality of functional modules interact with each other to implement the method according to the second aspect and the implementations of the second aspect. The plurality of functional modules may be implemented based on software, hardware, or a combination of software and hardware, and the plurality of functional modules may be randomly combined or divided based on a specific implementation.

According to a sixth aspect, a training device is provided. The training device includes a plurality of functional modules. The plurality of functional modules interact with each other to implement the method according to the third aspect and the implementations of the third aspect. The plurality of functional modules may be implemented based on software, hardware, or a combination of software and hardware, and the plurality of functional modules may be randomly combined or divided based on a specific implementation.

According to a seventh aspect, a fault recovery plan determining system is provided. The system includes a control device and an analysis device.

The analysis device is configured to: obtain a similar known fault that is in a plurality of known faults and whose fault root cause and a fault root cause of a target fault in a network meet a similarity condition, and send similar fault information corresponding to the target fault to the control device. The similar fault information includes an identifier of the target fault and a similar fault list. The similar fault list includes one or more similar known faults of the target fault. The control device is configured to: obtain a fault recovery plan corresponding to the similar known fault, and determine, based on the fault recovery plan corresponding to the similar known fault, a fault recovery plan corresponding to the target fault.

Optionally, the system further includes a training device.

The training device is configured to: obtain a similarity model through training by using fault root cause features of a plurality of sample faults, and send the similarity model to the analysis device. The sample fault is marked with a category label. Sample faults marked with a same category label correspond to a same fault recovery plan. The analysis device is configured to: for each of the plurality of known faults, input a fault root cause feature of the target fault and a fault root cause feature of the known fault into the similarity model, to obtain a similarity that is between the fault root cause of the target fault and a fault root cause of the known fault and that is output by the similarity model, and determine, based on similarities between the fault root cause of the target fault and the fault root causes of the plurality of known faults, the similar known fault that is in the plurality of known faults and whose fault root cause and the fault root cause of the target fault meet the similarity condition.

Optionally, the training device is further configured to send a fault recovery plan set to a control device. The fault recovery plan set includes correspondences between the plurality of known faults and fault recovery plans. The control device is configured to obtain, based on the fault recovery plan set, the fault recovery plan corresponding to the similar known fault Optionally, the control device is further configured to send the identifier of the target fault and the fault recovery plan corresponding to the target fault to the training device. The training device is further configured to add a correspondence between the target fault and the fault recovery plan corresponding to the target fault to the fault recovery plan set, to obtain an updated fault recovery plan set.

Optionally, the training device is further configured to send a fault root cause feature set to the analysis device. The fault root cause feature set includes correspondences between the plurality of known faults and fault root cause features. The analysis device is configured to obtain the fault root cause features of the plurality of known faults based on the fault root cause feature set.

Optionally, the similar fault information further includes the fault root cause feature of the target fault. The control device is further configured to send the identifier of the target fault and the fault root cause feature of the target fault to the training device. The training device is further configured to add the correspondence between the target fault and the fault root cause feature of the target fault to the fault root cause feature set, to obtain an updated fault root cause feature set.

According to an eighth aspect, a control device is further provided, including a processor and a memory.

The memory is configured to store a computer program, and the computer program includes program instructions.

The processor is configured to invoke the computer program to implement the method according to the first aspect and the implementations of the first aspect.

According to a ninth aspect, an analysis device is further provided, including a processor and a memory.

The memory is configured to store a computer program, and the computer program includes program instructions.

The processor is configured to invoke the computer program to implement the method according to the second aspect and the implementations of the second aspect.

According to a tenth aspect, a training device is further provided, including a processor and a memory.

The memory is configured to store a computer program, and the computer program includes program instructions.

The processor is configured to invoke the computer program to implement the method according to the third aspect and the implementations of the third aspect.

According to an eleventh aspect, a computer storage medium is provided. The computer storage medium stores instructions. When the instructions are executed by a processor of a computer device, the method according to the first aspect and the implementations of the first aspect is implemented, or the method according to the second aspect and the implementations of the second aspect is implemented, or the method according to the third aspect and the implementations of the third aspect is implemented.

According to a twelfth aspect, a chip is provided. The chip includes a programmable logic circuit and/or program instructions. When the chip runs, the method according to the first aspect and the implementations of the first aspect is implemented, or the method according to the second aspect and the implementations of the second aspect is implemented, or the method according to the third aspect and the implementations of the third aspect is implemented.

Beneficial effects brought by the technical solutions provided in this application include at least the following.

The control device determines, based on the fault recovery plan corresponding to the similar known fault of the target fault, the fault recovery plan corresponding to the target fault. In other words, regardless of whether the target fault is a known fault, the fault recovery plan corresponding to the target fault can be determined, provided that the similar known fault of the target fault can be found from the known faults. Therefore, a range of faults that can be processed is expanded. In addition, one fault in the network may cause a plurality of cascading faults, and the fault root cause can reflect an underlying cause of the fault. Therefore, the similar known fault of the fault in the network is searched for based on the fault root cause. There is a high matching degree between the found similar known fault and the fault, and there is also a high probability that the fault recovery plan corresponding to the similar known fault is applicable to the fault, so that reliability of the determined fault recovery plan is high. Further, the control device may further report a fault root cause feature of a live-network fault and a fault recovery plan corresponding to the live-network fault to a cloud device in real time, so that the cloud device automatically updates a fault recovery plan set and a fault root cause feature set, to expand a range of faults that can be processed. In addition, a fault recovery plan corresponding to the fault does not need to be manually summarized and a hard coding manner is used. This improves flexibility of expansion of the fault recovery plan and reduces maintenance difficulty.

DESCRIPTION OF EMBODIMENTS

Figure 1:
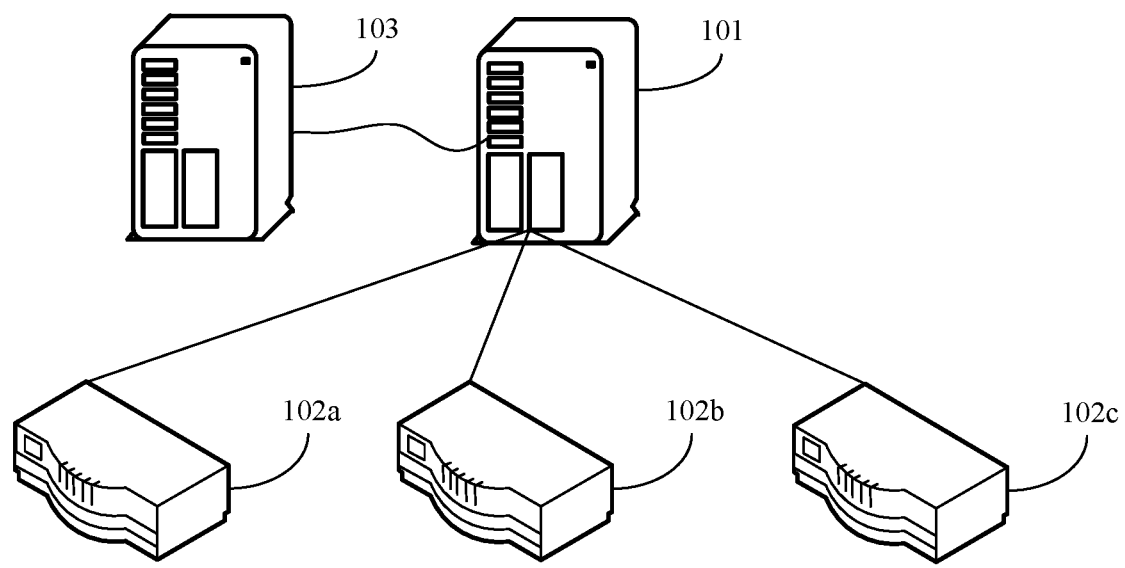
FIG. 1 is a schematic diagram of a structure of a fault recovery plan determining system according to an embodiment of this application.

To make the objectives, technical solutions, and advantages of this application clearer, the following further describes the implementations of this application in detail with reference to the accompanying drawings.

An embodiment of this application provides a fault recovery plan determining method. First, a control device obtains a similar known fault that is in a plurality of known faults and whose fault root cause and a fault root cause of a target fault in a network meet a similarity condition. Second, the control device obtains a fault recovery plan corresponding to the similar known fault. Then, the control device determines, based on the fault recovery plan corresponding to the similar known fault, a fault recovery plan corresponding to the target fault. One known fault may correspond to one or more fault recovery plans, and one fault recovery plan may also correspond to one or more known faults. The target fault in the network may be any fault in the network.

In this embodiment of this application, the control device can determine, based on the fault recovery plan corresponding to the similar known fault of the target fault in the network, the fault recovery plan corresponding to the target fault. In other words, regardless of whether the target fault is a known fault, the fault recovery plan corresponding to the target fault can be determined, provided that the similar known fault whose fault root cause and the fault root cause of the target fault meet the similarity condition can be found from the known faults. This expands a range of faults that can be processed. In addition, one fault in the network may cause a plurality of cascading faults, and the fault root cause can reflect an underlying cause of the fault. Therefore, the similar known fault of the fault in the network is searched for based on the fault root cause. There is a high matching degree between the found similar known fault and the fault, and there is also a high probability that the fault recovery plan corresponding to the similar known fault is applicable to the fault, so that reliability of the determined fault recovery plan is high.

Optionally, the fault root cause is represented by a fault root cause feature. The fault root cause feature includes a fault root cause object and a fault root cause event. The fault root cause event is an abnormal event causing a fault. For example, "physical interface interruption" may be a fault root cause event, indicating that a current fault is caused by physical interface interruption. The fault root cause object is used to indicate a type of a fault root cause network entity, the fault root cause network entity is used to indicate a specific location of the fault, and the fault root cause network entity is a network entity to which the fault root cause event belongs. The fault root cause object may be understood as an ontology of a fault root cause network entity, and the fault root cause network entity may be understood as an instantiation of the fault root cause object. A type of the fault root cause object includes a device type, an interface type, a protocol type, or a service type. The device type includes a board, a subboard, or the like. The interface type includes a physical interface, a loopback interface, a virtual local area network (VLAN) interface, or the like. The protocol type specifically includes open shortest path first (OSPF), a border gateway protocol (BGP), or the like. The service type specifically includes a virtual private network (VPN) service, a dynamic host configuration protocol (DHCP) service, or the like. For example, the fault root cause network entity is a physical interface A on a device A. In this case, the fault root cause object of the fault is a physical interface. For another example, the fault root cause network entity is an OSPF network segment, expressed as OSPF network-112.172.7.0-0.0.0.3. In this case, the fault root cause object of the fault is an OSPF network. For another example, the fault root cause network entity is a virtual extensible local area network (VXLAN) tunnel end point (VTEP), expressed as VXLAN tunnel-1.1.1.1-2.2.2.2, where 1.1.1.1 is a source VTEP address, and 2.2.2.2 is a destination VTEP address. In this case, the fault root cause object of the fault is a VXLAN tunnel.

Optionally, when the fault root cause network entity is a physical interface, the fault root cause feature may further include one or more of an intermittent interface disconnection indication of the fault root cause network entity (namely, an intermittent interface disconnection indication of the physical interface), an interface suspension indication of the fault root cause network entity (namely, an interface suspension indication of the physical interface), a packet receiving/sending state of the fault root cause network entity (namely, a packet receiving/sending state of the physical interface), an interface protocol status of the fault root cause network entity (namely, an interface protocol status of the physical interface), or a physical interface status of a device in which the fault root cause network entity is located. Alternatively, when the fault root cause network entity is a BGP peer, the fault root cause feature may further include a BGP route flapping indication of the fault root cause network entity and/or a physical interface status of a device in which the fault root cause network entity is located. Alternatively, the type of the fault root cause network entity is not limited, and the fault root cause feature may further include a physical interface status of a device in which the fault root cause network entity is located. The intermittent interface disconnection indication is used to indicate whether a corresponding physical interface is interrupted a plurality of times in a short period of time. For example, if the physical interface is interrupted a plurality of times in a short period of time, the intermittent interface disconnection indication of the physical interface is set to 1; otherwise, the intermittent interface disconnection indication is set to 0. The interface suspension indication is used to indicate whether a quantity of received packets or a quantity of sent packets is 0 when a corresponding physical interface is in a normal state. For example, if the quantity of received packets or the quantity of sent packets is 0 when the physical interface is in the normal state, the interface suspension indication of the physical interface is set to 1; otherwise, the interface suspension indication is set to 0. The BGP route flapping indication is used to indicate whether BGP route flapping occurs on a corresponding BGP peer. For example, if BGP route flapping occurs on the BGP peer, the BGP route flapping indication of the BGP peer is set to 1; otherwise, the BGP route flapping indication is set to 0. The physical interface status of the device in which the fault root cause network entity is located is used to indicate whether the physical interface status of the device is normal (up) or interrupted (down). For example, if all physical interfaces of the device are down, the physical interface status of the device is set to 1; otherwise, the physical interface status of the device is set to 0.

In this embodiment of this application, the fault recovery plan is an emergency disposal solution formulated for a fault that may occur in a network based on expert experience and a fault case in a live network. For example, the following fault recovery plans are mainly included.

(1) Isolate a device. For example, if a fault in a network is repeated restart or a heartbeat exception of a network device, leading to multichassis link aggregation group (MLAG) of a switch to be in a dual-active state, a recovery plan of isolating the device can be formulated for the fault.

(2) Isolate a board. For example, if a fault in a network is a main control board exception, a repeated main control board exception, a switching board exception, a repeated switching board exception, or the like, a recovery plan of isolating the board can be formulated for such a fault.

(3) Isolate an interface. For example, if a fault in a network may be interface suspension, an interface protocol status down, an intermittent interface disconnection, a unidirectional interface link fault, an increase in cyclic redundancy check (CRC) errors, a transmission control protocol (TCP) synchronization (SYN) flood attack, an address resolution protocol (ARP) attack, or the like, a recovery plan of isolating the interface can be formulated for such a fault.

(4) Isolate a virtual machine (VM) by using a Layer 3 access control list (ACL). For example, if a fault in a network is a TCP SYN flood attack, a recovery plan of isolating the VM by using the Layer 3 ACL can be formulated for the fault. This recovery plan configures an interface- or sub-interface-based ACL rule in a related device to defend against the TCP SYN flood attack. In the ACL rule, a source internet protocol (IP) address is an IP address of an attacker, and a destination IP address is a global IP address. A traffic policy is configured and applied to a direction of an inbound interface.

(5) Isolate the VM by using an ARP ACL. For example, if a fault in a network is an ARP attack, a recovery plan of isolating the VM by using the ARP ACL can be formulated for the fault. This recovery plan configures an ACL rule for an ARP packet in a related device to defend against the ARP attack.

(6) Isolate the VM by using an advanced ACL6. For example, if a fault in a network is a neighbor discovery protocol (ND) attack, a recovery plan of isolating the VM by using the advanced ACL6 can be formulated for the fault. This recovery plan determines, based on the interface and VLAN, a virtual routing forwarding table to which an attack ND packet is sent, and configures an advanced ACL6 rule in a related device to defend against the ND attack.

(7) Restart the device. For example, if a fault in a network is a soft failure on a device chip, loss of an ARP hardware entry, loss of a hardware entry in a routing table, suspected device entry flapping, or the like, a recovery plan of restarting the device can be formulated for such a fault. A hardware table is used to store running data of the chip. The hardware table is different from a definition of a software table. The software table is used to store configuration data.

(8) Restart the board. For example, if a fault in a network is a main control board exception, a repeated main control board exception, a switching board exception, a repeated switching board exception, and the like, a recovery plan of restarting the board can be formulated for such a fault.

(9) Refresh software and hardware table routes. For example, if a fault in a network is inconsistency between the software table and hardware table, leading to service interruption, a recovery plan of refreshing the software and hardware table routes can be formulated for the fault.

(10) Reset an IP address of an OSPF interface.

(11) Route entry synchronization and consistency check. This recovery plan invokes an application programming interface (API) of the device to perform synchronization on an abnormal forwarding info base (FIB) entry.

FIG. 1 is a schematic diagram of a structure of a fault recovery plan determining system according to an embodiment of this application. As shown in FIG. 1, the system includes a management device 101 and network devices 102a to 102c (collectively referred to as network devices 102) in a network. A quantity of network devices in FIG. 1 is merely used as an example, and is not intended to limit the fault recovery plan determining system provided in this embodiment of this application. The network in this embodiment of this application may be a data center network (DCN), a radio access network (RAN), a packet transport network (PTN), a metropolitan area network, a wide area network, a campus network, a VLAN, a VXLAN, or the like. A type of the network is not limited in this embodiment of this application.

The management device 101 may be one server, a server cluster including several servers, or a cloud computing service center. Optionally, the management device 101 includes a collection device, an analysis device, and a control device. The collection device, the analysis device, and the control device may be physical servers, or may be virtual servers. The collection device, the analysis device, and the control device are independent servers. Alternatively, the collection device and the analysis device are integrated in one server. Alternatively, the analysis device and the control device are integrated in one server. Alternatively, the collection device, the analysis device, and the control device are integrated in one server. In other words, the management device 101 may be used as a collection device, an analysis device, and/or a control device. The management device 101 is configured to manage and control the network device 102 in the network, and the network may be a site network. Different site networks may be different networks divided depending on corresponding dimensions. For example, the site networks may be networks in different regions, networks of different carriers, networks of different services, and different network domains. The management device 101 may be one or more devices. The network device 102 may be a router, a switch, or the like. The management device 101 is connected to the network device 102 through a wired network or a wireless network.

Optionally, the collection device in the management device 101 is configured to collect device data of the network device 102 in the network, and store the collected data in a database for the analysis device to use. The analysis device in the management device 101 is configured to perform anomaly detection on the network based on the device data of the network device 102, then perform fault locating on the network based on a plurality of abnormal events generated during anomaly detection, and determine, from known faults, a similar known fault of a located fault. The control device in the management device 101 is configured to determine, based on the similar known fault of the fault located by the analysis device, a fault recovery plan corresponding to the fault, and send a plan execution instruction to a related network device in the network. The management device 101 may further store a networking topology of the network.

Common faults in the network include configuration, entry, hardware, congestion, attack, status, resource, non-network-side faults, and the like. The device data obtained by the collection device may include at least one of management plane data, data plane data, or control plane data based on information required for fault locating performed by the analysis device. The management plane data includes configuration data, alarm data, and the like. For example, the configuration data includes a security control policy. The data plane data includes an ARP table, a media access control (MAC) table, a routing table, a tunnel status table (a VXLAN network), and an interface status. The control plane data includes central processing unit (CPU) data, memory data, a link layer discovery protocol (LLDP) status, a BGP status, an OSPF status, and the like. Both BGP and OSPF are routing protocols.

Optionally, the collection device periodically collects the device data of the network device 102. For example, the collection device collects the device data of the network device by using a simple network management protocol (SNMP) or a network telemetry technology. Alternatively, when the device data of the network device 102 changes, the network device 102 actively reports changed device data to the collection device.

Optionally, still refer to FIG. 1. The system further includes a training device 103. The training device 103 may be one server, a server cluster including several servers, or a cloud computing service center. The training device 103 is an upper-level device of the management device 101, and can manage one or more management devices 101. The training device 103 may train a model (for example, a similarity model) used to process data, and provide a data processing set (for example, a fault root cause feature set or a fault recovery plan set) and/or the model used to process data for the management device 101. When the training device 103 is configured to manage a plurality of management devices 101, the plurality of management devices 101 may share the data processing set and/or the model used to process data that are/is provided by the training device 103. The training device 103 and the management device 101 may be independent devices, or may be integrated into one device. This is not limited in this embodiment of this application. The training device 103 may also be referred to as a cloud device.

Figure 2A:
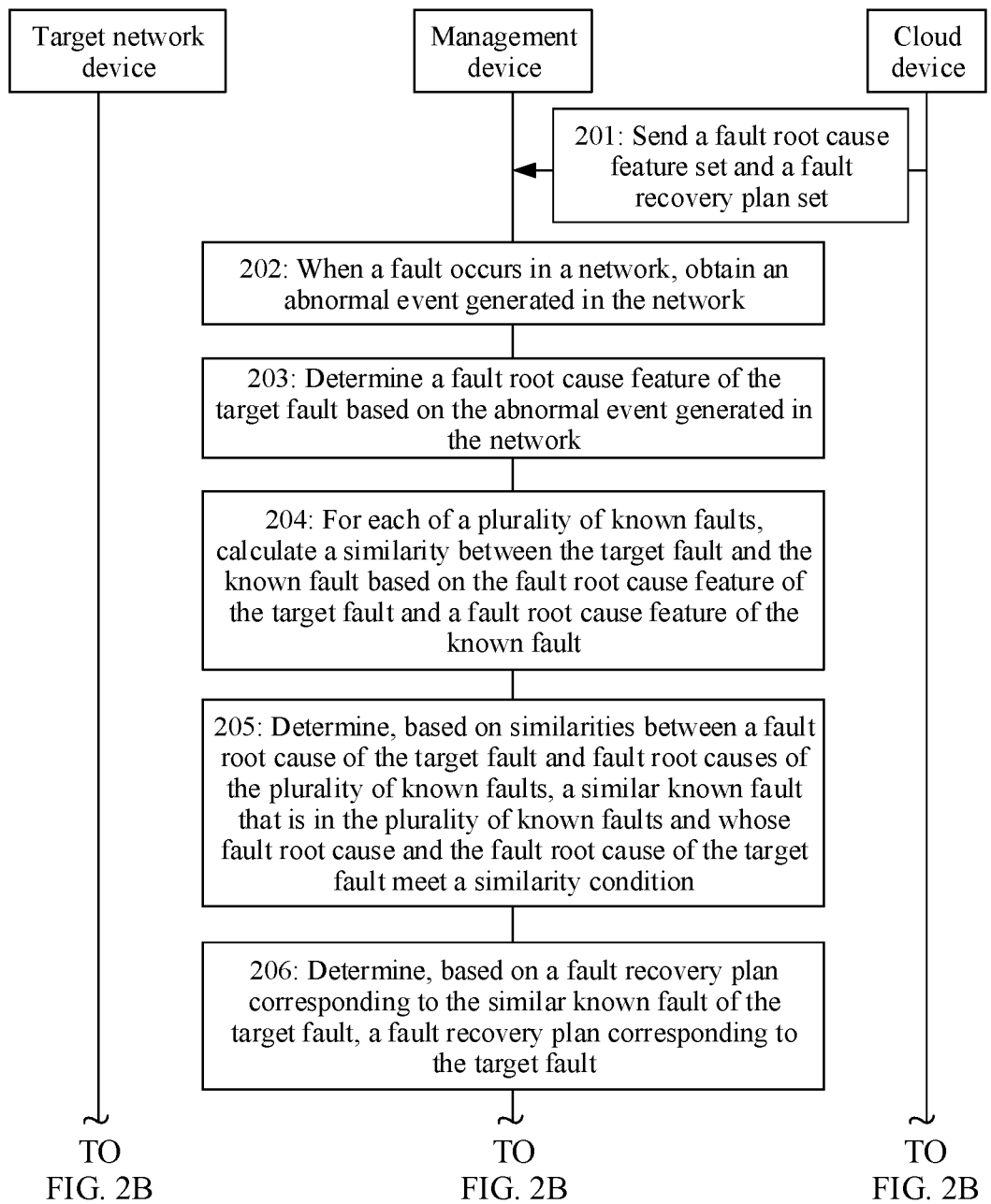
FIG. 2A and FIG. 2B are a schematic flowchart of a fault recovery plan determining method according to an embodiment of this application.
Figure 2B:
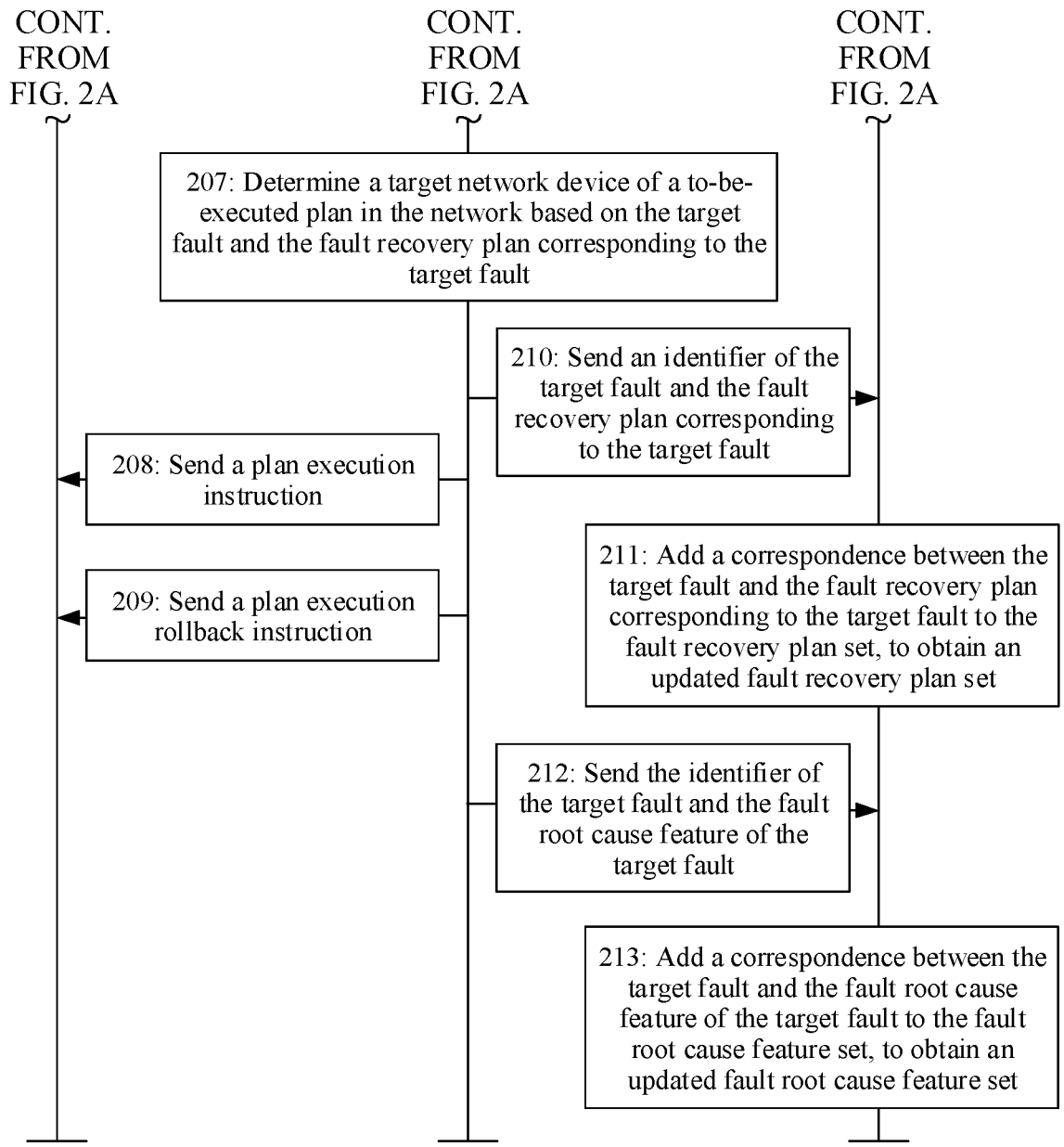

FIG. 2A and FIG. 2B are a schematic flowchart of a fault recovery plan determining method according to an embodiment of this application. The method may be applied to the fault recovery plan determining system shown in FIG. 1. As shown in FIG. 2A and FIG. 2B, the method includes the following steps.

Step 201: A cloud device sends a fault root cause feature set and a fault recovery plan set to a management device.

The fault root cause feature set includes correspondences between a plurality of known faults and fault root cause features. The fault root cause features in the fault root cause feature set are stored in a form of groups, and each group of fault root cause features belongs to one known fault. In this embodiment of this application, a fault root cause feature of the known fault includes at least a fault root cause object and a fault root cause event.

Optionally, the fault root cause feature set includes a correspondence between a fault identifier of the known fault and the fault root cause feature. The fault identifier includes a fault ID and/or a fault name. For example, the fault root cause feature set may be shown in Table 1.

TABLE 1

| Fault ID | Fault name | Fault root cause feature |
| --- | --- | --- |
| 10000001 | Intermittent interface disconnection | {Fault root cause object: an interface; Fault root cause event: linkdown_active; Intermittent interface disconnection indication: 1} |

TABLE 1-continued

| Fault ID | Fault name | Fault root cause feature |
| --- | --- | --- |
| 10000002 | Main control board exception | {Fault root cause object: a board; Fault root cause event: excessively high temperature of a main control board; Intermittent interface disconnection indication: 0} |
| ... | ... | ... |

Refer to Table 1. A type of the fault root cause feature includes a fault root cause object, a fault root cause event, and an intermittent interface disconnection indication.

The fault recovery plan set includes correspondences between the plurality of known faults and fault recovery plans. One known fault may correspond to one or more fault recovery plans, and one fault recovery plan may also correspond to one or more known faults.

Optionally, the fault recovery plan set includes a correspondence between the fault identifier of the known fault and the fault recovery plan. For example, the fault recovery plan set may be shown in Table 2.

TABLE 2

| Fault ID | Fault name | Fault recovery plan |
| --- | --- | --- |
| 10000001 | Intermittent interface disconnection | Isolate an interface |
| 10000002 | Main control board exception | 1. Isolate a board; 2. Restart the board |
| ... | ... | ... |

The cloud device stores the fault root cause feature set and the fault recovery plan set. The cloud device may collect a large quantity of fault cases in a network, and extract a fault root cause feature of each fault based on a specified type of the fault root cause feature, to generate an initial fault root cause feature set. A fault recovery plan in an initial fault recovery plan set may be formulated based on expert experience.

Step 202: When a fault occurs in the network, the management device obtains an abnormal event generated in the network.

Optionally, after obtaining the device data of the network device in the network, the management device performs anomaly detection on the device data of each network device, to obtain the abnormal event generated in the network.

Optionally, an implementation process in which the management device performs anomaly detection on the device data of the network device includes: The management device performs alarm analysis and aggregation on alarm data, to reduce an amount of the alarm data, and then extracts the abnormal event from aggregated alarm data. In addition/Alternatively, the management device performs log anomaly detection on a massive amount of logs, for example, performs log anomaly detection in a log template mining and/or log rareness analysis manner, to obtain the abnormal event. In addition/Alternatively, the management device performs anomaly detection on a reported key performance indicator (KPI), for example, uses a suddenly changed KPI as an abnormal KPI.

Optionally, the abnormal event includes one or more of an alarm log, a status change log, or an abnormal KPI. The alarm log includes an identifier of an abnormal network entity and an alarm type. The status change log includes configuration file change information, routing entry change information, and/or the like. For example, the status change log may include information such as "an access sub-interface is deleted" and "a destination IP host route is deleted". The abnormal KPI is used to describe an abnormal indicator of a network entity.

For ease of description, in the following embodiments of this application, the fault that occurs in the network is referred to as a target fault.

Step 203: The management device determines a fault root cause feature of the target fault based on the abnormal event generated in the network.

Optionally, the management device performs fault locating based on an expert rule or source tracing inference based on a network knowledge graph on the abnormal event generated in the network, to locate a fault root cause object and a fault root cause event of the target fault in the network.

Optionally, an implementation process in which the management device performs source tracing inference based on the network knowledge graph on the abnormal event generated in the network includes: First, the management device generates a knowledge graph of a network managed by the management device. After obtaining the abnormal event generated due to a network fault, the management device determines an abnormal network entity that generates the abnormal event in the network, for example, may identify, on the knowledge graph, the abnormal network entity that generates the abnormal event in the network. Then, the management device determines one or more fault root cause network entities from all abnormal network entities based on a fault propagation relationship between the network entities. A type of the network entity on the knowledge graph is a device type, an interface type, a protocol type, or a service type. The management device determines a fault root cause object of the fault based on the fault root cause network entity. For example, the fault root cause network entity is a physical interface A on a device A. In this case, the fault root cause object of the fault is a physical interface. The management device determines an abnormal event (that is, the abnormal event causing the fault) associated with the fault root cause network entity as a fault root cause event of the fault.

Optionally, a process in which the management device obtains the fault propagation relationship includes: The management device obtains a plurality of knowledge graph samples. All abnormal network entities and fault root cause network entities that generate, when a fault occurs in a network to which the knowledge graph sample belongs, abnormal events in the network to which the knowledge graph sample belongs are identified in each knowledge graph sample. The management device determines the fault propagation relationship based on the plurality of knowledge graph samples. Each knowledge graph sample is a fault case, and the abnormal network entity and the fault root cause network entity in the knowledge graph sample may be manually determined. Optionally, the management device may learn the fault propagation relationship in the plurality of knowledge graph samples by using a graph embedding algorithm or the like. Alternatively, when a probability that two network entities on a same knowledge graph triplet are simultaneously abnormal is greater than a threshold, the management device may determine that fault propagation is performed between the two network entities.

For example, when a fault occurs on an interface of the network device, the interface cannot perform normal communication, and consequently, a route IP address used by the interface is unreachable. Therefore, the management device may obtain a group of fault propagation relationships: The fault of the interface causes the route IP address used by the interface to be unreachable. When the management device obtains a first abnormal event used to indicate the fault of the interface and a second abnormal event used to indicate that the route IP address used by the interface is unreachable, the management device determines that the first abnormal event is a fault root cause event, and determines that the interface is a fault root cause object.

In this embodiment of this application, the management device may learn the fault propagation relationship between network entities by using the plurality of knowledge graph samples, and determine, based on the fault propagation relationship, the fault root cause network entity in the abnormal network entities on the knowledge graph of the target network, to determine a fault root cause feature. This implements automated inference and locating of a network fault root cause.

Optionally, the fault propagation relationship between network entities may alternatively be determined by another device and then sent to the management device. For a manner in which the another device determines the fault propagation relationship between network entities, refer to the foregoing manner in which the management device determines the fault propagation relationship between network entities. Details are not described herein in this embodiment of this application. Certainly, the fault propagation relationship may also be formulated based on an expert rule.

Step 204: For each of the plurality of known faults, the management device calculates a similarity between the target fault and the known fault based on the fault root cause feature of the target fault and the fault root cause feature of the known fault.

Optionally, the similarity between the target fault and the known fault is equal to a weighted average value of a similarity between each fault root cause feature of the target fault and each fault root cause feature of the known fault. For example, the type of the fault root cause feature includes a fault root cause object, a fault root cause event, and an intermittent interface disconnection indication. A similarity between the fault root cause object of the target fault and a fault root cause object of the known fault is a first similarity, a similarity between a fault root cause event of the target fault and a fault root cause event of the known fault is a second similarity, and a similarity between an intermittent interface disconnection indication of the target fault and an intermittent interface disconnection indication of the known fault is a third similarity. In this case, the similarity between the target fault and the known fault is equal to a weighted average value of the first similarity, the second similarity, and the third similarity.

Optionally, an implementation process of step 204 includes: The management device inputs the fault root cause feature of the target fault and the fault root cause feature of the known fault into a similarity model, to obtain a similarity that is between a fault root cause of the target fault and a fault root cause of the known fault and that is output by the similarity model. The similarity model is obtained through training based on fault root cause features of a plurality of sample faults. The sample fault is marked with a category label. Sample faults marked with a same category label correspond to a same fault recovery plan. Sample faults marked with different category labels may correspond to a same fault recovery plan or different fault recovery plans. The similarity model is a machine learning model obtained through training in a supervised learning manner.

In an implementation, after obtaining the plurality of sample faults, the management device obtains the similarity model through training by using the fault root cause features of the plurality of sample faults.

Optionally, each fault has d fault root cause features, and the similarity model is expressed as follows:

$$\text{similarity}(a, b) = \sum_{k=1}^{d} w_k \times s(a_k, b_k)$$

similarity(a,b) represents a similarity between a fault a and a fault b, and $s(a_k, b_k)$ represents a similarity between a $k^{th}$ fault root cause feature of the fault a and a $k^{th}$ fault root cause feature of the fault b. $w_k$ represents a weight of the $k^{th}$ fault root cause feature, and $$\sum_{k=1}^{d} w_k = 1.$$

A similarity of discrete fault root cause features meets:

$$s(a_k, b_k) = \begin{cases} 1, & \text{if } a_k = b_k \\ 0, & \text{otherwise} \end{cases}$$

A similarity of continuous fault root cause features meets:

$$s(a_k, b_k) = 1 - \frac{a_k - b_k}{\max - \min}$$

Value ranges of $a_k$ and $b_k$ are the same, max indicates a maximum value in the value range of $a_k$ or $b_k$, and min indicates a minimum value in the value range of $a_k$ or $b_k$.

In this embodiment of this application, the management device obtains the similarity model through training, that is, determines weights of k fault root cause features, so that a similarity between the sample faults marked with a same category label is greater than a similarity between the sample faults marked with different category labels.

Optionally, after obtaining the similarity model through training, the management device may further invoke, by using the fault root cause features of the plurality of sample faults, the similarity model to determine a similarity threshold. Specifically, the management device inputs fault root cause features of a plurality of sample fault pairs into the similarity model in batches, to obtain a similarity that is between fault root causes of each sample fault pair and that is output by the similarity model. Then, the management device determines the similarity threshold based on the similarities between the fault root causes of the plurality of sample fault pairs. Each sample fault pair includes two sample faults, and a similarity between fault root causes of one sample fault pair is a similarity between fault root causes of two sample faults in the sample fault pair. The plurality of sample fault pairs include a first-category sample fault pair and a second-category sample fault pair. The first-category sample fault pair includes two sample faults marked with a same category label, and the second-category sample fault pair includes two sample faults marked with different category labels.

The similarity threshold may be a value of demarcation between a similarity between fault root causes of the sample faults marked with a same category label and a similarity between fault root causes of the sample faults marked with different category labels. For example, the fault root cause features of the plurality of sample fault pairs are input into the trained similarity model in batches. For the first-category sample fault pair, most similarities output by the similarity model are greater than a target threshold. For the second-category sample fault pair, most similarities output by the similarity model are less than the target threshold. In this case, the target threshold may be determined as the similarity threshold. For example, a value of the similarity threshold may be 0.9.

In this embodiment of this application, the plurality of sample faults used to train the similarity model and the plurality of sample faults used to determine the similarity threshold may be the same or different. The former is used to adjust a parameter of the similarity model, and the latter is used to collect statistics on a similarity between fault root causes of sample faults of a same category and a similarity between fault root causes of sample faults of different categories, to find a proper similarity threshold.

In another implementation, the management device receives a similarity model and/or a similarity threshold from the cloud device. In other words, after obtaining the plurality of sample faults, the cloud device obtains the similarity model through training by using the fault root cause features of the plurality of sample faults. After obtaining the similarity model through training, the cloud device may further invoke, by using the fault root cause features of the plurality of sample faults, the similarity model to determine the similarity threshold. For an implementation process in which the cloud device trains the similarity model and determines the similarity threshold, refer to the foregoing process in which the management device trains the similarity model and determines the similarity threshold. Details are not described herein again in this embodiment of this application.

Step 205: The management device determines, based on the similarities between the fault root cause of the target fault and the fault root causes of the plurality of known faults, a similar known fault that is in the plurality of known faults and whose fault root cause and the fault root cause of the target fault meet a similarity condition.

In a possible implementation, the management device determines a known fault that is in the plurality of known faults and whose fault root cause and the fault root cause of the target fault have a similarity greater than the similarity threshold as a similar known fault of the target fault.

Optionally, the management device determines all known faults that are in the plurality of known faults and whose fault root causes and the fault root cause of the target fault have similarities greater than the similarity threshold as similar known faults of the target fault. In other words, the target fault may have one or more similar known faults. Certainly, in this manner, the management device may also fail to find a similar known fault of the target fault from the known faults.

In this implementation, a similar fault of the target fault is searched for from the known faults based on the similarity threshold, and accuracy of the determined similar fault is high, so that reliability of a fault recovery plan corresponding to the determined target fault is high.

In another possible implementation, the management device sorts the similarities between the fault root cause of the target fault and the fault root causes of the plurality of known faults, and uses n known faults whose fault root causes and the fault root cause of the target fault have highest similarities as the similar known faults of the target fault, where n is a positive integer.

For example, the management device uses three known faults whose fault root causes and the fault root cause of the target fault have highest similarities as the similar known faults of the target fault.

In this implementation, the similar known fault of the target fault can always be found from the known faults, so that the fault recovery plan corresponding to the target fault can always be determined, and a range of faults that can be processed is large.

In still another possible implementation, a management device uses, as the similar known faults of the target fault, known faults whose fault root causes and the fault root cause of the target fault have similarities greater than the similarity threshold in the plurality of known faults and that are first m known faults in descending order of similarities between the fault root causes and the fault root cause of the target fault, where m is a positive integer.

In this implementation, the known fault whose fault root cause and the fault root cause of the target fault have the similarity greater than the similarity threshold can be screened, so that accuracy of the determined similar fault can be ensured, and a quantity of the determined similar faults can be limited, to reduce a subsequent calculation amount.

Step 206: The management device determines, based on a fault recovery plan corresponding to the similar known fault of the target fault, the fault recovery plan corresponding to the target fault.

Optionally, an implementation process of step 206 includes: The management device evaluates, based on a network configuration of the network, feasibility of the fault recovery plan corresponding to the similar known fault of the target fault. The management device determines one or more of feasible fault recovery plans as the fault recovery plan corresponding to the target fault. The network configuration includes a network topology and/or device data.

For example, if a link on which a device is located has a redundant link (backup link), the fault recovery plan to "isolate a device" is feasible for the device. If the link on which a device is located does not have a redundant link, the fault recovery plan to "isolate a device" is infeasible for the device.

Optionally, in response to a case in which the plurality of fault recovery plans corresponding to the similar known fault of the target fault are feasible, the management device first separately evaluates, based on the network configuration of the network, degrees of impact of the plurality of fault recovery plans on a service running in the network. Then, the management device determines a fault recovery plan that is in the plurality of fault recovery plans and that has a minimum degree of impact on the service running in the network as the fault recovery plan corresponding to the target fault.

For example, the similar known fault of the target fault is an ARP attack fault, and the ARP attack fault corresponds to two fault recovery plans: isolating a VM and isolating an interface. After determining that both the two fault recovery plans of isolating the VM and isolating the interface are feasible, the management device evaluates degrees of impact of isolating the VM and isolating the interface on the service running in the network. To isolate the VM, ACL blocking needs to be performed on each MAC address of an ARP attack source. To be specific, a quantity of required ACL resources is equal to a quantity of ARP attack sources. If the ACL resources are sufficient in the network, the fault recovery plan of isolating the VM is feasible. The fault recovery plan of isolating the VM affects only an isolated attack source VM and has small impact on the service running in the network. The fault recovery plan of isolating the interface affects all VMs (including the attack source VM and a normal VM) mounted to an isolated interface and has large impact on the service running in the network. Because a degree of impact of isolating the VM on the service running in the network is less than a degree of impact of isolating the interface on the service running in the network, the management device uses the fault recovery plan of isolating the VM as the fault recovery plan corresponding to the target fault. If the fault recovery plan of isolating the VM is not feasible due to insufficient ACL resources in the network, the management device may use the fault recovery plan of isolating the interface as the fault recovery plan corresponding to the target fault.

Alternatively, after obtaining the fault recovery plan corresponding to the similar known fault of the target fault, the management device may also output all fault recovery plans corresponding to the similar known fault, and use a fault recovery plan specified by a selection instruction as the fault recovery plan corresponding to the target fault. The selection instruction may be triggered by operation and maintenance personnel. For example, the management device may send all the fault recovery plans corresponding to the similar known fault of the target fault to an operations support system (OSS) or another terminal device connected to the management device, for the OSS or the terminal device to display. Certainly, if the management device has a display function, the management device may also display all the fault recovery plans corresponding to the similar known fault of the target fault on a display interface of the management device. After the management device outputs the fault recovery plan corresponding to the similar known fault of the target fault, the operation and maintenance personnel may specify one of the fault recovery plans as the fault recovery plan corresponding to the target fault, or the operation and maintenance personnel may input another fault recovery plan as the fault recovery plan corresponding to the target fault. This is not limited in this embodiment of this application.

Optionally, in response to a case in which there is no similar known fault whose fault root cause and the fault root cause of the target fault meet a similarity condition in the plurality of known faults, the management device outputs a fault identifier and the fault root cause feature of the target fault, so that the operation and maintenance personnel determine the fault recovery plan corresponding to the target fault. For example, the management device sends the fault identifier and the fault root cause feature of the target fault to the OSS or the another terminal device connected to the management device, for the OSS or the terminal device to display. Certainly, if the management device has the display function, the management device may also display the fault identifier and the fault root cause feature of the target fault on the display interface of the management device.

In this embodiment of this application, the management device can determine, based on the fault recovery plan corresponding to the similar known fault of the target fault, the fault recovery plan corresponding to the target fault. In other words, regardless of whether the target fault is a known fault, the fault recovery plan corresponding to the target fault can be determined, provided that the similar known fault of the target fault can be found from the known faults. Therefore, a range of faults that can be processed is expanded. In addition, one fault in the network may cause a plurality of cascading faults, and the fault root cause can reflect an underlying cause of the fault. Therefore, the similar known fault of the fault in the network is searched for based on the fault root cause. There is a high matching degree between the found similar known fault and the fault, and there is also a high probability that the fault recovery plan corresponding to the similar known fault is applicable to the fault, so that reliability of the determined fault recovery plan is high.

Optionally, after determining the fault recovery plan corresponding to the target fault, the management device may further distribute the fault recovery plan to a related network device that needs to execute the fault recovery plan in the network, to implement end-to-end fault recovery. For this process, refer to the following step 207 to step 208.

Step 207: The management device determines a target network device of a to-be-executed plan in the network based on the target fault and the fault recovery plan corresponding to the target fault.

Optionally, the target network device of the to-be-executed plan in the network includes a device in which a fault root cause network entity of the target fault is located, an access device in the network, and/or the like. For example, when the fault root cause object of the target fault is a device or an interface, the target network device of the to-be-executed plan in the network is usually the device in which the fault root cause network entity is located. For another example, when the fault root cause event of the target fault is a DHCP service timeout caused by an OSPF route ID conflict, the target network device of the to-be-executed plan in the network is usually a network device on which the OSPF route ID conflict in the network occurs. For another example, when the target fault is an ARP attack fault, the target network device of the to-be-executed plan in the network is an edge device (that is, an access device) mounted to the attack source VM.

Step 208: The management device sends a plan execution instruction to the target network device.

The plan execution instruction is used to instruct the target network device to execute the fault recovery plan corresponding to the target fault. The plan execution instruction includes the fault recovery plan corresponding to the target fault.

Optionally, the fault recovery plan corresponding to the target fault included in the plan execution instruction may be an execution script of the fault recovery plan. For example, the execution script of the fault recovery plan to "isolate a device" includes the following content.

a) Determine a device role, for example, determine whether a current device is a spine device or a leaf device.

b) If the current device is a leaf device or a non-spine leaf device, record a cost value of a spine side interface on the current device and then adjust the cost value to a maximum value. Traverse access side interfaces on the current device, record a current status of the access side interface, and shut down the access side interface that is not in a down state except in-band management interfaces.

c) If the current device is a spine device, and the spine device is an independent device group or device group members are isolated, an isolation operation cannot be performed on the current device; otherwise, record the cost value of the current device connected to a spine interface, and then adjust the cost value to a maximum value. Traverse the spine interfaces connected to a leaf device, record a current status of the interface, and shut down the interface that is not in a down state.

Step 209: The management device sends a plan execution rollback instruction to the target network device.

The plan execution rollback instruction is used to instruct the target network device to be restored to a state before the fault recovery plan corresponding to the target fault is executed. Optionally, in response to receiving a rollback trigger instruction, the management device sends the plan execution rollback instruction to the target network device. The back trigger instruction may be triggered by a specified operation performed by the operation and maintenance personnel on the management device. For example, when detecting a pressing operation on a button, the management device determines that the back trigger instruction is received. Alternatively, the rollback trigger instruction may be from another device. To be specific, the management device may send the plan execution rollback instruction to the target network device under a control instruction (the rollback trigger instruction) of the another device.

In this embodiment of this application, after sending the plan execution instruction to the target network device, the management device may further send the plan execution rollback instruction to the target network device, to instruct the target network device to be restored to the state before the fault recovery plan. This implements a state rollback function of the network device is executed. If the network device executes an improper fault recovery plan, this function can quickly restore the network device to an original state, to improve network running reliability.

Optionally, after determining the fault recovery plan corresponding to the target fault, the management device may further send the fault recovery plan corresponding to the target fault and/or the fault root cause feature of the target fault to the cloud device, so that the cloud device updates the fault recovery plan set and/or the fault root cause feature set. For this implementation process, refer to the following step 210 to step 213.

Step 210: The management device sends an identifier of the target fault and the fault recovery plan corresponding to the target fault to a cloud device.

The identifier of the target fault and the fault recovery plan corresponding to the target fault are used by the cloud device to add a correspondence between the target fault and the fault recovery plan corresponding to the target fault to the fault recovery plan set, to obtain an updated fault recovery plan set.

Step 211: The cloud device adds the correspondence between the target fault and the fault recovery plan corresponding to the target fault to the fault recovery plan set, to obtain the updated fault recovery plan set.

Optionally, each time the cloud device updates the fault recovery plan set, the cloud device may send the updated fault recovery plan set to the management device, or the cloud device periodically sends a latest fault recovery plan set to the management device.

Step 212: The management device sends the identifier of the target fault and the fault root cause feature of the target fault to the cloud device.

The identifier of the target fault and the fault root cause feature of the target fault are used by the cloud device to add a correspondence between the target fault and the fault root cause feature of the target fault to the fault root cause feature set, to obtain an updated fault root cause feature set.

Optionally, step 210 and step 212 may be simultaneously performed. To be specific, the management device synchronously sends the fault recovery plan corresponding to the target fault and the fault root cause feature of the target fault to the cloud device. For example, the target fault is an intermittent interface disconnection fault, and content sent by the management device to the cloud device may be shown in Table 3.

TABLE 3

| Fault ID | Fault name | Fault root cause feature | Fault recovery plan |
|---|---|---|---|
| 10000001 | Intermittent interface disconnection | (Fault root cause object: an interface; Fault root cause event: linkdown_active; Intermittent interface disconnection indication: 1} | Isolate an interface |

Step 213: The cloud device adds the correspondence between the target fault and the fault root cause feature of the target fault to the fault root cause feature set, to obtain the updated fault root cause feature set.

Optionally, each time the cloud device updates the fault root cause feature set, the cloud device may send the updated fault root cause feature set to the management device, or the cloud device periodically sends a latest fault root cause feature set to the management device.

Optionally, when the similarity model is obtained through training by the cloud device, after receiving a fault root cause feature of a live-network fault and a fault recovery plan corresponding to the live-network fault that are reported by the management device, the cloud device may continuously train and update the similarity model, to improve accuracy and reliability of the model.

In this embodiment of this application, the management device may report the fault root cause feature of the live-network fault and the fault recovery plan corresponding to the live-network fault to the cloud device in real time, so that the cloud device automatically updates a fault recovery plan set and a fault root cause feature set, to expand a range of faults that can be processed. In addition, a fault recovery plan corresponding to the fault does not need to be manually summarized and a hard coding manner is used. This improves flexibility of expansion of the fault recovery plan and reduces maintenance difficulty.

Optionally, the management device may be one device (a control device), or the management device may include a plurality of devices (a collection device, an analysis device, and/or a control device). In this embodiment of this application, that the management device includes the analysis device and the control device, and the analysis device integrates a function of a collection device is used as an example. An implementation process of step 201 may include: The cloud device sends the fault root cause feature set to the analysis device, and sends the fault recovery plan set to the control device. Step 202 to step 205 are performed by the analysis device. Step 206 to step 210 and step 212 are performed by the control device.

Figure 3A:
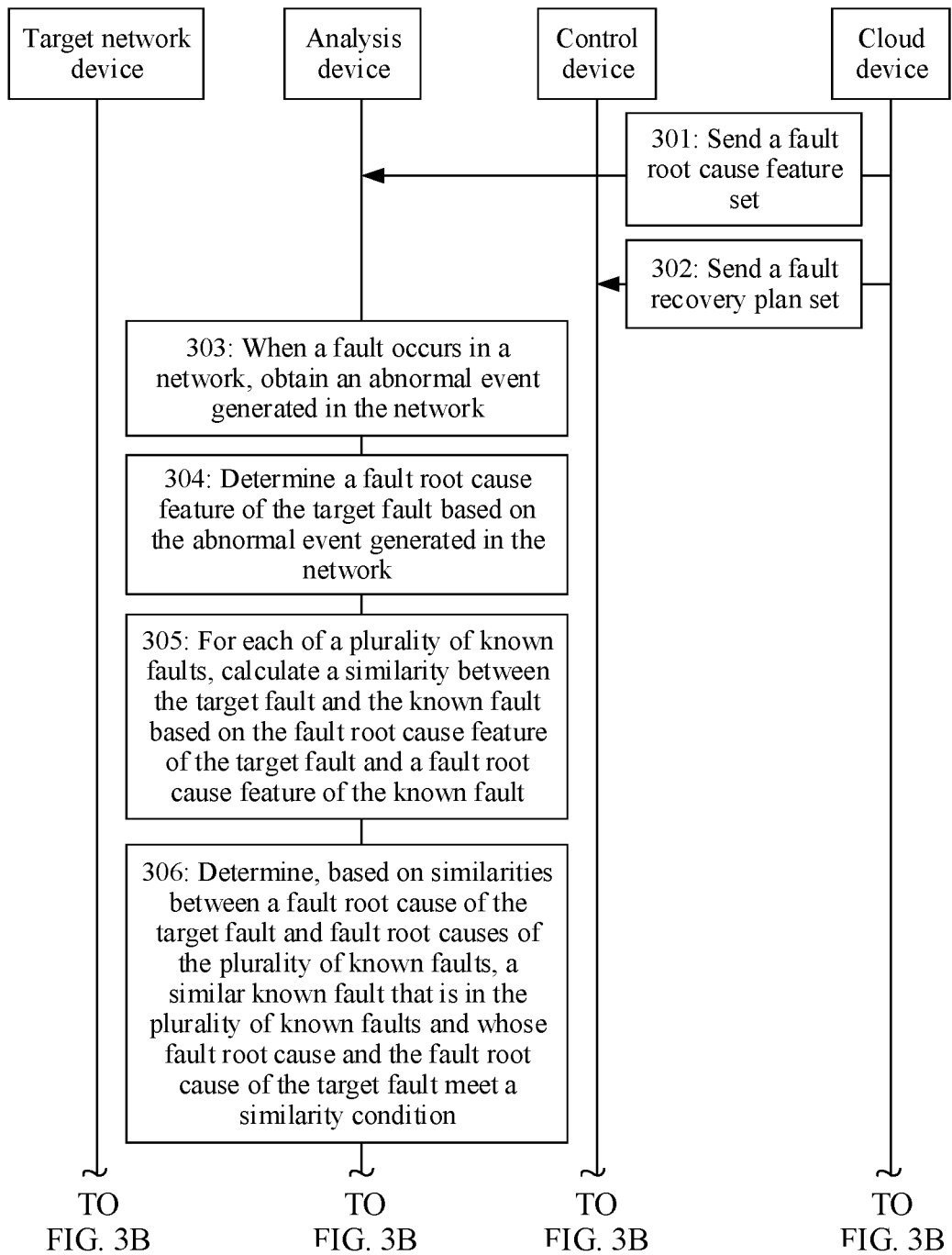
FIG. 3A and FIG. 3B are a schematic diagram of an implementation process of a fault recovery plan determining method according to an embodiment of this application.
Figure 3B:
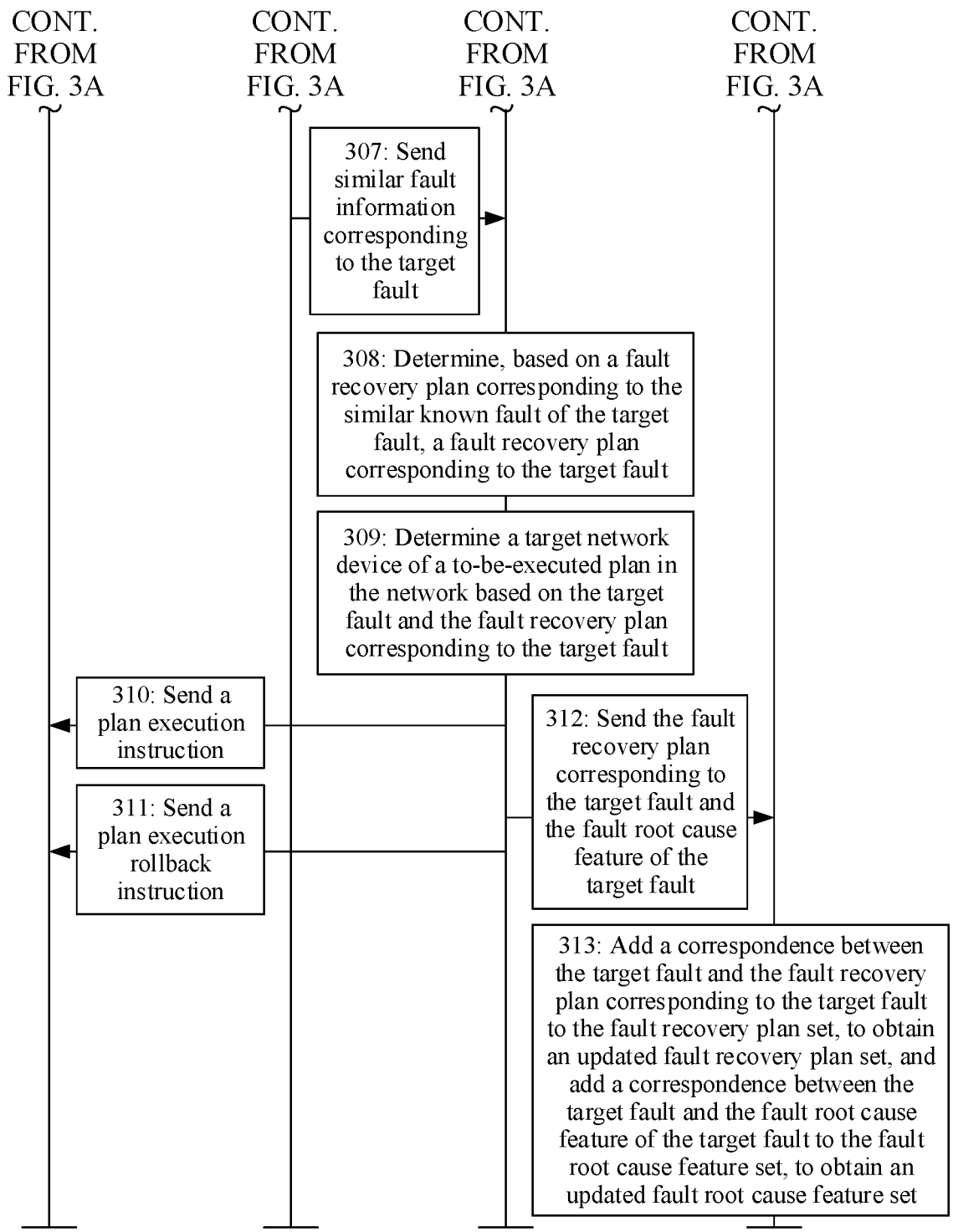

For example, FIG. 3A and FIG. 3B are a schematic diagram of an implementation process of a fault recovery plan determining method according to an embodiment of this application. As shown in FIG. 3A and FIG. 3B, the implementation process includes the following steps.

Step 301: A cloud device sends a fault root cause feature set to an analysis device.

The fault root cause feature set includes correspondences between a plurality of known faults and fault root cause features. For an explanation of this step, refer to related content in step 201 and step 204. Details are not described in this embodiment of this application again.

Step 302: The cloud device sends a fault recovery plan set to a control device.

The fault recovery plan set includes correspondences between the plurality of known faults and fault recovery plans. For an explanation of this step, refer to related content in step 201. Details are not described herein again in this embodiment of this application.

Step 303: When a fault occurs in a network, the analysis device obtains an abnormal event generated in the network.

For an explanation of this step, refer to related content in step 202. Details are not described herein again in this embodiment of this application.

Step 304: The analysis device determines a fault root cause feature of the target fault based on the abnormal event generated in the network.

For an explanation of this step, refer to related content in step 203. Details are not described herein again in this embodiment of this application.

Step 305: For each of the plurality of known faults, the analysis device calculates a similarity between the target fault and the known fault based on a fault root cause feature of the target fault and a fault root cause feature of the known fault.

Optionally, the cloud device may further send a similarity model and a similarity threshold to the analysis device. Alternatively, the analysis device may train the similarity model and determine the similarity threshold. In this case, the analysis device may input the fault root cause feature of the target fault and the fault root cause feature of the known fault into the similarity model, to obtain a similarity that is between a fault root cause of the target fault and a fault root cause of the known fault and that is output by the similarity model.

For an explanation of this step, refer to related content in step 204. Details are not described herein again in this embodiment of this application.

Step 306: The analysis device determines, based on the similarities between the fault root cause of the target fault and the fault root causes of the plurality of known faults, a similar known fault that is in the plurality of known faults and whose fault root cause and the fault root cause of the target fault meet a similarity condition.

Optionally, the analysis device determines a known fault that is in the plurality of known faults and whose fault root cause and the fault root cause of the target fault have a similarity greater than the similarity threshold as a similar known fault of the target fault.

For an explanation of this step, refer to related content in step 205. Details are not described herein again in this embodiment of this application.

Step 307: The analysis device sends similar fault information corresponding to the target fault to the control device.

The similar fault information includes an identifier of the target fault and a similar fault list. The similar fault list includes one or more similar known faults of the target fault. The similar fault information is used by the control device to determine a fault recovery plan corresponding to the target fault.

Optionally, the similar fault information further includes a fault root cause feature of the target fault. For example, the similar fault information may be shown in Table 4.

TABLE 4

| Identifier of a target fault | | Fault root cause feature of a target fault | Similar fault list | |
|---|---|---|---|---|
| Fault ID | Fault name | | Similar known fault ID | Similar known fault name |
| 10000001 | Intermittent interface disconnection | (Fault root cause object: an interface; Fault root cause event: linkdown_active; Intermittent interface disconnection indication: 1} | 10000001 | Intermittent interface disconnection to a VM |
| | | | 10000004 | Intermittent interface disconnection between a leaf device and a spine device |

Optionally, the similar fault information may further include an occurrence timestamp of the target fault and the like.

Step 308: The control device determines, based on a fault recovery plan corresponding to the similar known fault of the target fault, the fault recovery plan corresponding to the target fault.

For an explanation of this step, refer to related content in step 206. Details are not described herein again in this embodiment of this application.

Step 309: The control device determines a target network device of ato-be-executed plan in the network based on the target fault and the fault recovery plan corresponding to the target fault.

For an explanation of this step, refer to related content in step 207. Details are not described herein again in this embodiment of this application.

Step 310: The control device sends a plan execution instruction to the target network device.

The plan execution instruction is used to instruct the target network device to execute the fault recovery plan corresponding to the target fault. The plan execution instruction includes the fault recovery plan corresponding to the target fault. For an explanation of this step, refer to related content in step 208. Details are not described herein again in this embodiment of this application.

Step 311: The control device sends a plan execution rollback instruction to the target network device.

The plan execution rollback instruction is used to instruct the target network device to be restored to a state before the fault recovery plan corresponding to the target fault is executed. Optionally, in response to receiving a rollback trigger instruction, the control device sends the plan execution rollback instruction to the target network device. For an explanation of this step, refer to related content in step 209. Details are not described herein again in this embodiment of this application.

Step 312: The control device sends the fault recovery plan corresponding to the target fault and the fault root cause feature of the target fault to the cloud device.

For an explanation of this step, refer to related content in step 210 and step 212. Details are not described in this embodiment of this application again.

Step 313: The cloud device adds a correspondence between the target fault and the fault recovery plan corresponding to the target fault to the fault recovery plan set, to obtain an updated fault recovery plan set, and adds a correspondence between the target fault and the fault root cause feature of the target fault to the fault root cause feature set, to obtain an updated fault root cause feature set.

For an explanation of this step, refer to related content in step 211 and step 213. Details are not described in this embodiment of this application again.

Optionally, when the similarity model and the similarity threshold are obtained through training by the cloud device, after receiving a fault root cause feature of a live-network fault and a fault recovery plan corresponding to the live-network fault that are reported by the management device, the cloud device may continuously train and update the similarity model, to improve accuracy and reliability of the model. The cloud device may further update the similarity threshold, to improve accuracy of determining a fault similarity.

Figure 4:
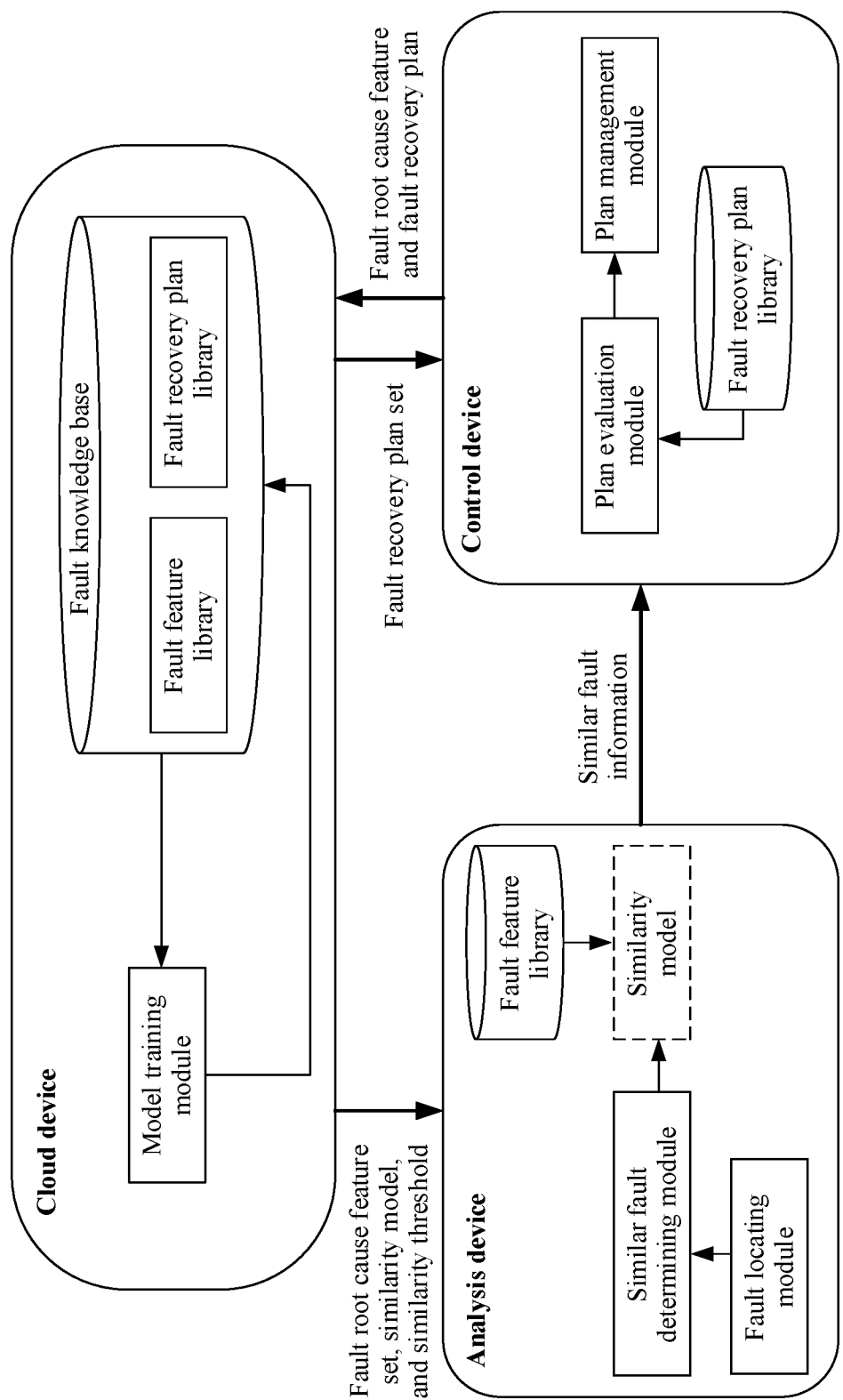
FIG. 4 is a schematic diagram of a function of a fault recovery plan determining system according to an embodiment of this application.

For example, FIG. 4 is a schematic diagram of a function of a fault recovery plan determining system for implementing the method shown in FIG. 3A and FIG. 3B according to an embodiment of this application. As shown in FIG. 4, the fault recovery plan determining system includes the cloud device, the analysis device, and the control device. The cloud device includes a model training module and a fault knowledge base. The model training module is configured to train a similarity model and determine a similarity threshold. The fault knowledge base includes a fault feature library and a fault recovery plan library. The fault feature library is used to store a fault root cause feature set, and the fault recovery plan library is used to store a fault recovery plan set. The cloud device is configured to send the fault root cause feature set, the similarity model, and the similarity threshold to the analysis device, and send the fault recovery plan set to the control device. The analysis device includes a fault locating module, a similar fault determining module, and a fault feature library. The fault locating module is configured to locate a fault (a live-network fault for short) that occurs in a network and extract a fault root cause feature. The similar fault determining module is configured to invoke the similarity model, to determine a similar known fault of the live-network fault from known faults in the fault feature library. The analysis device is configured to send similar fault information corresponding to the live-network fault to the control device. The control device includes a plan evaluation module, a plan management module, and a fault recovery plan library. The plan evaluation module is configured to obtain, from the fault recovery plan, and evaluate feasibility of a fault recovery plan corresponding to the similar known fault of the live-network fault. The plan management module is configured to determine a fault recovery plan corresponding to the live-network fault and a network device that needs to execute the plan. The control device is configured to send a fault root cause feature of the live-network fault and the corresponding fault recovery plan to the cloud device.

A sequence of the steps in the fault recovery plan determining method provided in this embodiment of this application may be properly adjusted, and the steps may also be correspondingly added or deleted according to a situation. Any variation method readily figured out by a person skilled in the art within the technical scope disclosed in this application shall fall within the protection scope of this application. Therefore, details are not described herein.

In conclusion, according to the fault recovery plan determining method provided in this embodiment of this application, the management device determines, based on the fault recovery plan corresponding to the similar known fault of the target fault, the fault recovery plan corresponding to the target fault. In other words, regardless of whether the target fault is a known fault, the fault recovery plan corresponding to the target fault can be determined, provided that the similar known fault of the target fault can be found from the known faults. Therefore, a range of faults that can be processed is expanded. In addition, one fault in the network may cause a plurality of cascading faults, and the fault root cause can reflect an underlying cause of the fault. Therefore, the similar known fault of the fault in the network is searched for based on the fault root cause. There is a high matching degree between the found similar known fault and the fault, and there is also a high probability that the fault recovery plan corresponding to the similar known fault is applicable to the fault, so that reliability of the determined fault recovery plan is high. Further, the management device may further report a fault root cause feature of a live-network fault and a fault recovery plan corresponding to the live-network fault to a cloud device in real time, so that the cloud device automatically updates a fault recovery plan set and a fault root cause feature set, to expand a range of faults that can be processed. In addition, a fault recovery plan corresponding to the fault does not need to be manually summarized and a hard coding manner is used. This improves flexibility of expansion of the fault recovery plan and reduces maintenance difficulty.

Figure 5:
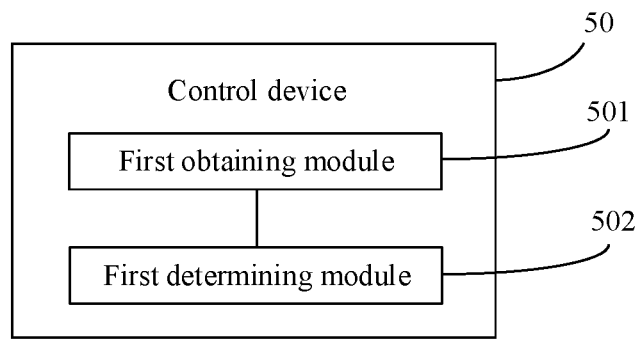
FIG. 5 is a schematic diagram of a structure of a control device according to an embodiment of this application.

FIG. 5 is a schematic diagram of a structure of a control device according to an embodiment of this application. As shown in FIG. 5, a control device 50 includes:

A first obtaining module 501 is configured to obtain a similar known fault that is in a plurality of known faults and whose fault root cause and a fault root cause of a target fault in a network meet a similarity condition.

A first determining module 502 is configured to: obtain a fault recovery plan corresponding to the similar known fault, and determine, based on the fault recovery plan corresponding to the similar known fault, a fault recovery plan corresponding to the target fault.

Optionally, the fault root cause is represented by a fault root cause feature, the fault root cause feature includes a fault root cause object and a fault root cause event, the fault root cause event is an abnormal event causing a fault, the fault root cause object is used to indicate a type of a fault root cause network entity, and the fault root cause network entity is a network entity to which the fault root cause event belongs.

Optionally, the fault root cause network entity is a physical interface, and the fault root cause feature further includes one or more of an intermittent interface disconnection indication of the fault root cause network entity, an interface suspension indication of the fault root cause network entity, a packet receiving/sending state of the fault root cause network entity, an interface protocol status of the fault root cause network entity, or a physical interface status of a device in which the fault root cause network entity is located. Alternatively, the fault root cause network entity is a BGP peer, and the fault root cause feature further includes a BGP route flapping indication of the fault root cause network entity and/or a physical interface status of a device in which the fault root cause network entity is located. Alternatively, the fault root cause feature is not limited to the type of the fault root cause network entity, and further includes a physical interface status of a device in which the fault root cause network entity is located.

Optionally, the first obtaining module 501 is configured to: obtain fault root cause features of the plurality of known faults; for each of the plurality of known faults, calculate a similarity between the fault root cause of the target fault and the fault root cause of the known fault based on a fault root cause feature of the target fault and a fault root cause feature of the known fault; and determine, based on the similarities between the fault root cause of the target fault and the fault root causes of the plurality of known faults, the similar known fault that is in the plurality of known faults and whose fault root cause and the fault root cause of the target fault meet the similarity condition.

Optionally, the first obtaining module 501 is configured to determine a known fault that is in the plurality of known faults and whose fault root cause and the fault root cause of the target fault have a similarity greater than the similarity threshold as a similar known fault.

Optionally, the first obtaining module 501 is configured to input the fault root cause feature of the target fault and the fault root cause feature of the known fault into a similarity model, to obtain the similarity that is between the fault root cause of the target fault and the fault root cause of the known fault and that is output by the similarity model. The similarity model is obtained through training based on fault root cause features of a plurality of sample faults. The sample fault is marked with a category label. Sample faults marked with a same category label correspond to a same fault recovery plan.

Figure 6:
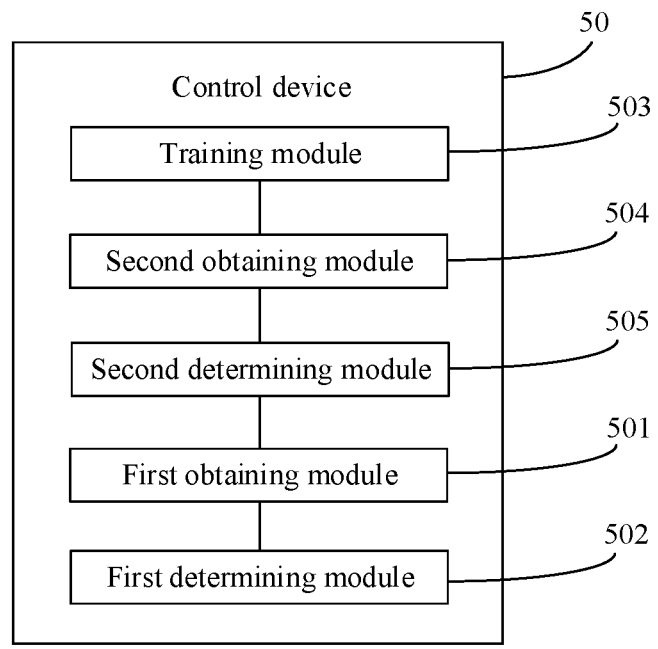
FIG. 6 is a schematic diagram of a structure of another control device according to an embodiment of this application.

Optionally, as shown in FIG. 6, the control device 50 further includes a training module 503, configured to obtain the similarity model through training by using the fault root cause features of the plurality of sample faults.

Optionally, still refer to FIG. 6. The control device 50 further includes: a second obtaining module 504, configured to input fault root cause features of a plurality of sample fault pairs into the similarity model in batches, to obtain a similarity that is between fault root causes of each sample fault pair and that is output by the similarity model, where the plurality of sample fault pairs include a first-category sample fault pair and a second-category sample fault pair, the first-category sample fault pair includes two sample faults marked with a same category label, and the second-category sample fault pair includes two sample faults marked with different category labels; and a second determining module 505, configured to determine a similarity threshold based on the similarities between the fault root causes of the plurality of sample fault pairs.

Figure 7:
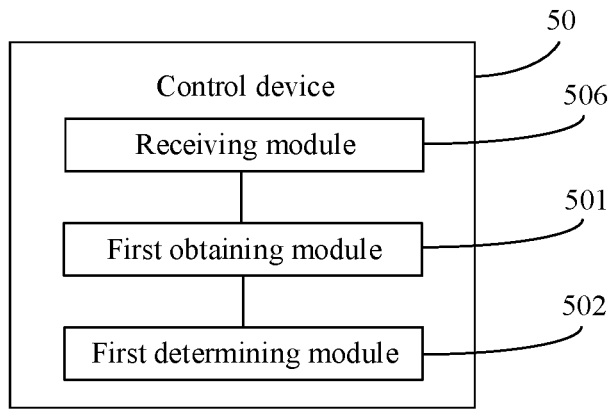
FIG. 7 is a schematic diagram of a structure of still another control device according to an embodiment of this application.

Optionally, as shown in FIG. 7, the control device 50 further includes a receiving module 506.

The receiving module 506 is configured to receive the similarity model and/or the similarity threshold that are/is from a training device. In addition/Alternatively, the receiving module 506 is configured to receive a fault root cause feature set from the training device. The fault root cause feature set includes correspondences between the plurality of known faults and the fault root cause features. Correspondingly, the first obtaining module 501 is configured to obtain the fault root cause features of the plurality of known faults based on the fault root cause feature set.

Figure 8:
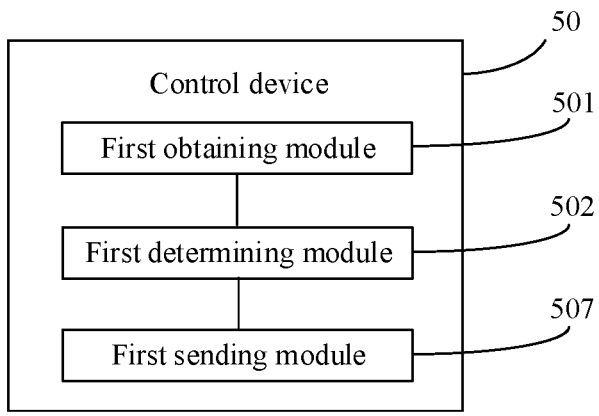
FIG. 8 is a schematic diagram of a structure of yet another control device according to an embodiment of this application.

Optionally, as shown in FIG. 8, the control device 50 further includes a first sending module 507.

The first sending module 507 is configured to send an identifier of the target fault and the fault root cause feature of the target fault to the training device, so that the training device adds a correspondence between the target fault and the fault root cause feature of the target fault to the fault root cause feature set, to obtain an updated fault root cause feature set.

Figure 9:
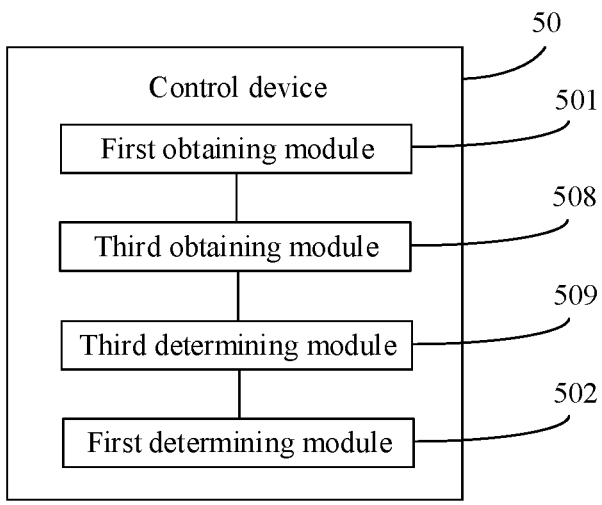
FIG. 9 is a schematic diagram of a structure of a further control device according to an embodiment of this application.

Optionally, as shown in FIG. 9, the control device 50 further includes: a third obtaining module 508, configured to: when a fault occurs in the network, obtain an abnormal event generated in the network; and a third determining module 509, configured to determine a fault root cause feature of the fault based on the abnormal event generated in the network.

Optionally, the first obtaining module 501 is configured to receive similar fault information that corresponds to the target fault and that is from an analysis device. The similar fault information includes an identifier of the target fault and a similar fault list. The similar fault list includes one or more similar known faults of the target fault.

Optionally, the similar fault information further includes a fault root cause feature of the target fault.

Optionally, the first determining module 502 is configured to: evaluate, based on a network configuration of the network, feasibility of the fault recovery plan corresponding to the similar known fault, where the network configuration includes a networking topology and/or device data, and the device data includes one or more of management plane data, data plane data, or control plane data; and determine one or more of feasible fault recovery plans as the fault recovery plan corresponding to the target fault.

Optionally, the first determining module 502 is configured to: in response to a case in which the plurality of fault recovery plans are feasible, separately evaluate, based on the network configuration of the network, degrees of impact of the plurality of fault recovery plans on a service running in the network; and determine a fault recovery plan that is in the plurality of fault recovery plans and that has a minimum degree of impact on the service running in the network as the fault recovery plan corresponding to the target fault.

Figure 10:
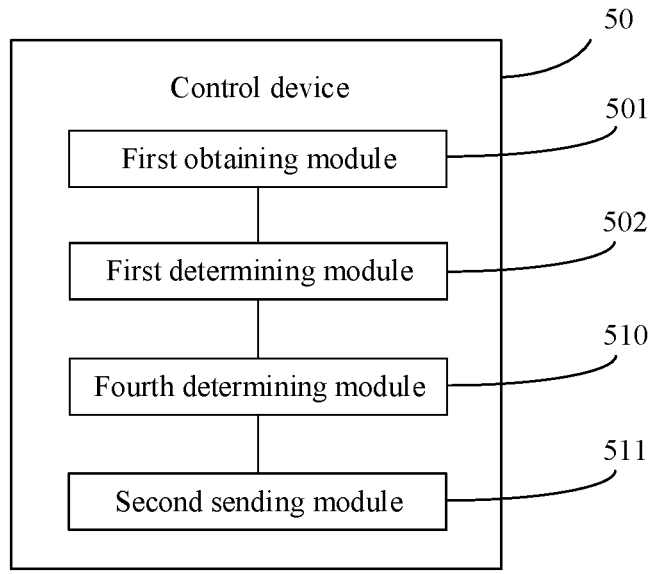
FIG. 10 is a schematic diagram of a structure of a control device according to another embodiment of this application.

Optionally, as shown in FIG. 10, the control device 50 further includes: a fourth determining module 510, configured to determine a target network device of a to-be-executed plan in the network based on the target fault and the fault recovery plan corresponding to the target fault; and a second sending module 511, configured to send a plan execution instruction to the target network device. The plan execution instruction is used to instruct the target network device to execute the fault recovery plan corresponding to the target fault. The plan execution instruction includes the fault recovery plan corresponding to the target fault.

Optionally, the second sending module 511 is further configured to send a plan execution rollback instruction to the target network device. The plan execution rollback instruction is used to instruct the target network device to be restored to a state before the fault recovery plan corresponding to the target fault is executed.

Optionally, the receiving module 506 is further configured to receive a fault recovery plan set from the training device. The fault recovery plan set includes correspondences between the plurality of known faults and fault recovery plans. Correspondingly, the first determining module 502 is configured to obtain, based on the fault recovery plan set, the fault recovery plan corresponding to the similar known fault.

Optionally, the first sending module 507 is further configured to send the identifier of the target fault and the fault recovery plan corresponding to the target fault to the training device, so that the training device adds a correspondence between the target fault and the fault recovery plan corresponding to the target fault to the fault recovery plan set, to obtain an updated fault recovery plan set.

In conclusion, according to the control device provided in this embodiment of this application, the first determining module can determine, based on the fault recovery plan corresponding to the similar known fault of the target fault, the fault recovery plan corresponding to the target fault. In other words, regardless of whether the target fault is a known fault, the fault recovery plan corresponding to the target fault can be determined, provided that the similar known fault of the target fault can be found from the known faults. Therefore, a range of faults that can be processed is expanded. In addition, one fault in the network may cause a plurality of cascading faults, and the fault root cause can reflect an underlying cause of the fault. Therefore, the similar known fault of the fault in the network is searched for based on the fault root cause. There is a high matching degree between the found similar known fault and the fault, and there is also a high probability that the fault recovery plan corresponding to the similar known fault is applicable to the fault, so that reliability of the determined fault recovery plan is high.

Figure 11:
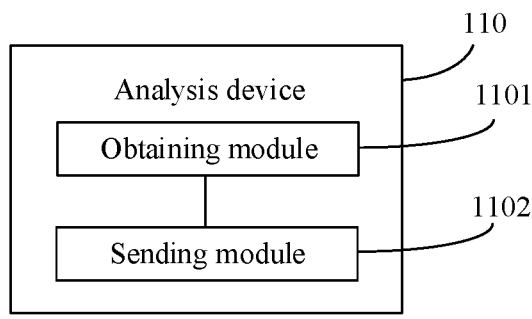
FIG. 11 is a schematic diagram of a structure of an analysis device according to an embodiment of this application.

FIG. 11 is a schematic diagram of a structure of an analysis device according to an embodiment of this application. As shown in FIG. 11, an analysis device 110 includes: an obtaining module 1101, configured to obtain a similar known fault that is in a plurality of known faults and whose fault root cause and a fault root cause of a target fault in a network meet a similarity condition; and a sending module 1102, configured to send similar fault information corresponding to the target fault to a control device. The similar fault information includes an identifier of the target fault and a similar fault list. The similar fault list includes one or more similar known faults of the target fault. The similar fault information is used by the control device to determine a fault recovery plan corresponding to the target fault.

Optionally, the similar fault information further includes a fault root cause feature of the target fault.

Optionally, the obtaining module 1101 is configured to: obtain fault root cause features of the plurality of known faults; for each of the plurality of known faults, calculate a similarity between the fault root cause of the target fault and a fault root cause of the known fault based on the fault root cause feature of the target fault and a fault root cause feature of the known fault; and determine, based on the similarities between the fault root cause of the target fault and the fault root causes of the plurality of known faults, the similar known fault that is in the plurality of known faults and whose fault root cause and the fault root cause of the target fault meet the similarity condition.

Optionally, the obtaining module 1101 is configured to determine a known fault that is in the plurality of known faults and whose fault root cause and the fault root cause of the target fault have a similarity greater than the similarity threshold as a similar known fault.

Optionally, the obtaining module 1101 is configured to input the fault root cause feature of the target fault and the fault root cause feature of the known fault into a similarity model, to obtain the similarity that is between the fault root cause of the target fault and the fault root cause of the known fault and that is output by the similarity model. The similarity model is obtained through training based on fault root cause features of a plurality of sample faults. The sample fault is marked with a category label. Sample faults marked with a same category label correspond to a same fault recovery plan.

In conclusion, according to the analysis device provided in this embodiment of this application, the obtaining module obtains the similar known fault of the target fault, and the sending module sends the similar fault information corresponding to the target fault to the control device, so that the control device can determine, based on the fault recovery plan corresponding to the similar known fault of the target fault, the fault recovery plan corresponding to the target fault. In other words, regardless of whether the target fault is a known fault, the fault recovery plan corresponding to the target fault can be determined, provided that the similar known fault of the target fault can be found from the known faults. Therefore, a range of faults that can be processed is expanded. In addition, one fault in the network may cause a plurality of cascading faults, and the fault root cause can reflect an underlying cause of the fault. Therefore, the similar known fault of the fault in the network is searched for based on the fault root cause. There is a high matching degree between the found similar known fault and the fault, and there is also a high probability that the fault recovery plan corresponding to the similar known fault is applicable to the fault, so that reliability of the determined fault recovery plan is high.

Figure 12:
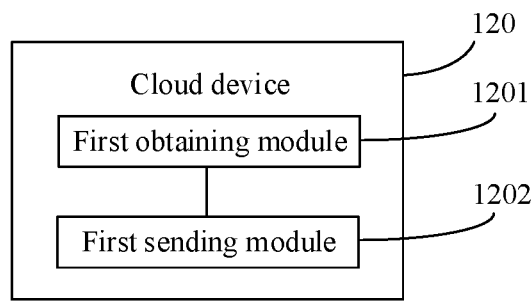
FIG. 12 is a schematic diagram of a structure of a cloud device according to an embodiment of this application.

FIG. 12 is a schematic diagram of a structure of a cloud device according to an embodiment of this application. The cloud device is the training device in the foregoing embodiment. As shown in FIG. 12, a cloud device 120 includes:

- a first obtaining module 1201, configured to obtain a similarity model, where the similarity model is obtained through training based on fault root cause features of a plurality of sample faults, the sample fault is marked with a category label, and sample faults marked with a same category label correspond to a same fault recovery plan; and
- a first sending module 1202, configured to send the similarity model to an analysis device, so that the analysis device determines a similar known fault of a target fault that occurs in a network, where the similar known fault is used to determine a fault recovery plan corresponding to the target fault.

Optionally, the first obtaining module 1201 is configured to obtain the similarity model through training by using the fault root cause features of the plurality of sample faults.

Figure 13:
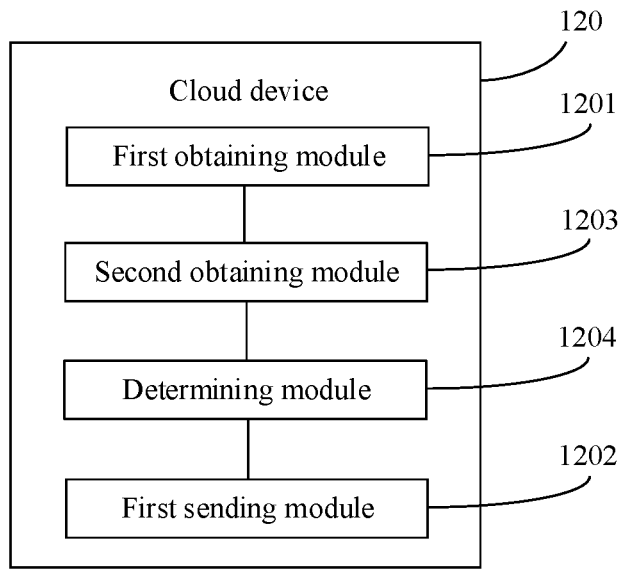
FIG. 13 is a schematic diagram of a structure of another cloud device according to an embodiment of this application.

Optionally, as shown in FIG. 13, the cloud device 120 further includes: a second obtaining module 1203, configured to input fault root cause features of a plurality of sample fault pairs into the similarity model in batches, to obtain a similarity that is between fault root causes of each sample fault pair and that is output by the similarity model, where the plurality of sample fault pairs include a first-category sample fault pair and a second-category sample fault pair, the first-category sample fault pair includes two sample faults marked with a same category label, and the second-category sample fault pair includes two sample faults marked with different category labels; and a determining module 1204, configured to determine a similarity threshold based on the similarities between the fault root causes of the plurality of sample fault pairs. The first sending module 1202 is further configured to send the similarity threshold to the analysis device.

Figure 14:
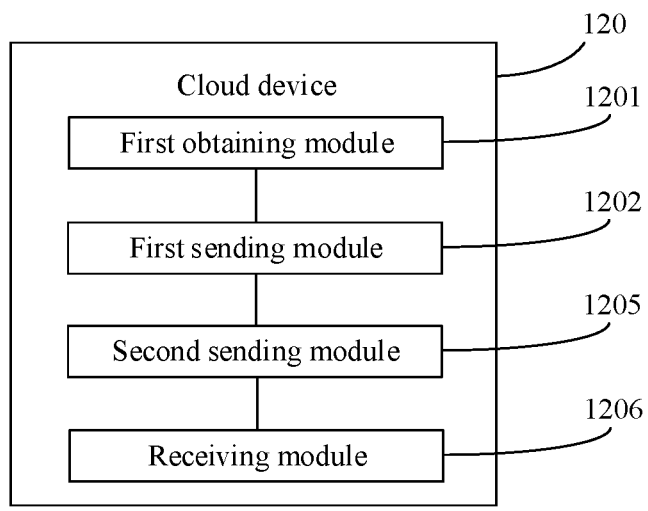
FIG. 14 is a schematic diagram of a structure of still another cloud device according to an embodiment of this application.

Optionally, as shown in FIG. 14, the cloud device 120 further includes a second sending module 1205. The first sending module 1202 is configured to send a fault root cause feature set to the analysis device. The fault root cause feature set includes a plurality of fault root cause feature subsets corresponding to a plurality of known faults, and each fault root cause feature subset includes a fault root cause feature of one known fault. The second sending module 1205 is configured to send a fault recovery plan set to a control device. The fault recovery plan set includes correspondences between the plurality of known faults and fault recovery plans.

Optionally, still refer to FIG. 14. The cloud device 120 further includes: a receiving module 1206, configured to receive an identifier of the target fault, a fault root cause feature of the target fault, and the fault recovery plan corresponding to the target fault that are from the control device; and an updating module 1207, configured to: add a correspondence between the target fault and the fault root cause feature of the target fault to the fault root cause feature set, to obtain an updated fault root cause feature set, and add a correspondence between the target fault and the fault recovery plan corresponding to the target fault to the fault recovery plan set, to obtain an updated fault recovery plan set.

For the apparatus in the foregoing embodiment, specific manners of executing operations by each module are described in detail in embodiments related to the method. Details are not described herein.

An embodiment of this application further provides a control device, including a processor and a memory.

The memory is configured to store a computer program, and the computer program includes program instructions.

The processor is configured to invoke the computer program to implement the actions performed by the management device in the method embodiment corresponding to FIG. 2A and FIG. 2B, or implement the actions performed by the control device in the method embodiment corresponding to FIG. 3A and FIG. 3B.

An embodiment of this application further provides an analysis device, including a processor and a memory.

The memory is configured to store a computer program, and the computer program includes program instructions.

The processor is configured to invoke the computer program to implement the actions performed by the analysis device in the method embodiment corresponding to FIG. 3A and FIG. 3B.

An embodiment of this application further provides a cloud device, including a processor and a memory.

The memory is configured to store a computer program, and the computer program includes program instructions.

The processor is configured to invoke the computer program to implement the actions performed by the cloud device in the method embodiment corresponding to FIG. 3A and FIG. 3B.

Figure 15:
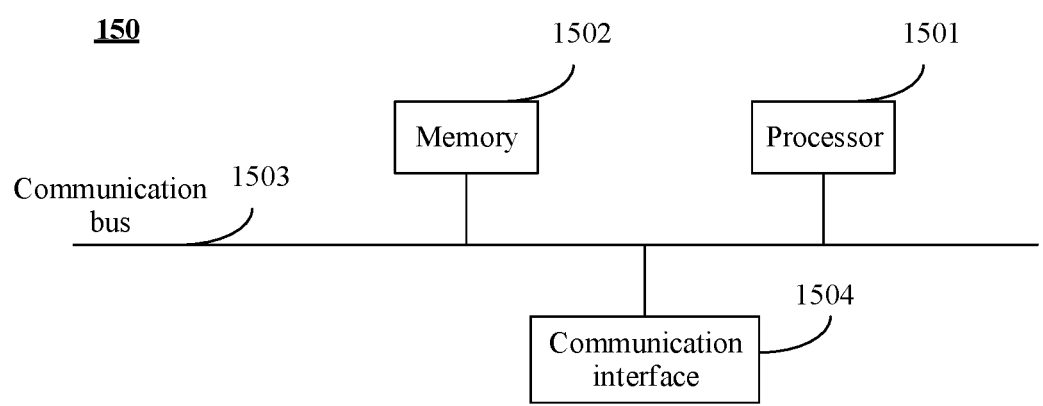
FIG. 15 is a block diagram of a fault recovery plan determining apparatus according to an embodiment of this application.

For example, FIG. 15 is a block diagram of a fault recovery plan determining apparatus according to an embodiment of this application. The apparatus may be a control device, an analysis device, or a cloud device. As shown in FIG. 15, an apparatus 150 includes a processor 1501 and a memory 1502.

The memory 1502 is configured to store a computer program, and the computer program includes program instructions.

The processor 1501 is configured to invoke the computer program to, when the apparatus 150 is a control device, implement the actions performed by the management device in the method embodiment corresponding to FIG. 2A and FIG. 2B, or implement the actions performed by the control device in the method embodiment corresponding to FIG. 3A and FIG. 3B; when the apparatus 150 is an analysis device, implement the actions performed by the analysis device in the method embodiment corresponding to FIG. 3A and FIG. 3B; or when the apparatus 150 is a cloud device, implement the actions performed by the cloud device in the method embodiment corresponding to FIG. 3A and FIG. 3B.

Optionally, the apparatus 150 further includes a communication bus 1503 and a communication interface 1504.

The processor 1501 includes one or more processing cores, and the processor 1501 executes various function applications and data processing by running the computer program.

The memory 1502 may be configured to store the computer program. Optionally, the memory may store an operating system and an application program unit that is required for at least one function. The operating system may be an operating system such as a real time operating system (RTX), LINUX, UNIX, WINDOWS, or OS X.

There may be a plurality of communication interfaces 1504, and the communication interface 1504 is configured to communicate with another device.

The memory 1502 and the communication interface 1504 are separately connected to the processor 1501 through the communication bus 1503.

An embodiment of this application further provides a computer storage medium. The computer storage medium stores instructions. When the instructions are executed by a processor, the actions performed by the management device, the control device, the analysis device, or the cloud device in the foregoing method embodiments are implemented.

An embodiment of this application further provides a fault recovery plan determining system, including a control device and an analysis device.

The analysis device is configured to: obtain a similar known fault that is in a plurality of known faults and whose fault root cause and a fault root cause of a target fault in a network meet a similarity condition, and send similar fault information corresponding to the target fault to the control device. The similar fault information includes an identifier of the target fault and a similar fault list. The similar fault list includes one or more similar known faults of the target fault. The control device is configured to: obtain a fault recovery plan corresponding to the similar known fault, and determine, based on the fault recovery plan corresponding to the similar known fault, a fault recovery plan corresponding to the target fault.

Optionally, the system further includes a cloud device (namely, a training device).

The cloud device is configured to: obtain a similarity model through training by using fault root cause features of a plurality of sample faults, and send the similarity model to the analysis device. The sample fault is marked with a category label. Sample faults marked with a same category label correspond to a same fault recovery plan. The analysis device is configured to: for each of the plurality of known faults, input the fault root cause feature of the target fault and the fault root cause feature of the known fault into a similarity model, to obtain the similarity that is between the fault root cause of the target fault and the fault root cause of the known fault and that is output by the similarity model, and determine, based on the similarities between the fault root cause of the target fault and the fault root causes of the plurality of known faults, the similar known fault that is in the plurality of known faults and whose fault root cause and the fault root cause of the target fault meet the similarity condition.

Optionally, the cloud device is further configured to send a fault recovery plan set to a control device. The fault recovery plan set includes correspondences between the plurality of known faults and fault recovery plans. The control device is configured to obtain, based on the fault recovery plan set, the fault recovery plan corresponding to the similar known fault Optionally, the control device is further configured to send the identifier of the target fault and the fault recovery plan corresponding to the target fault to the cloud device. The cloud device is further configured to add a correspondence between the target fault and the fault recovery plan corresponding to the target fault to the fault recovery plan set, to obtain an updated fault recovery plan set.

Optionally, the cloud device is further configured to send a fault root cause feature set to the analysis device. The fault root cause feature set includes correspondences between the plurality of known faults and fault root cause features. The analysis device is configured to obtain the fault root cause features of the plurality of known faults based on the fault root cause feature set.

Optionally, the similar fault information further includes a fault root cause feature of the target fault. The control device is further configured to send the identifier of the target fault and the fault root cause feature of the target fault to the cloud device. The cloud device is further configured to add the correspondence between the target fault and the fault root cause feature of the target fault to the fault root cause feature set, to obtain an updated fault root cause feature set.

An embodiment of this application further provides another fault recovery plan determining system, including a control device and a cloud device.

The cloud device is configured to send a fault recovery plan set to a control device. The fault recovery plan set includes correspondences between the plurality of known faults and fault recovery plans. The control device is configured to: obtain, based on the fault recovery plan set, a fault recovery plan corresponding to a similar known fault that is in the plurality of known faults and whose fault root cause and a fault root cause of a target fault in a network meet a similarity condition, and determine, based on the fault recovery plan corresponding to the similar known fault, a fault recovery plan corresponding to the target fault.

Optionally, the control device is further configured to send the identifier of the target fault and the fault recovery plan corresponding to the target fault to the cloud device. The cloud device is further configured to add a correspondence between the target fault and the fault recovery plan corresponding to the target fault to the fault recovery plan set, to obtain an updated fault recovery plan set.

Optionally, the system further includes an analysis device.

The analysis device is configured to: obtain the similar known fault that is in the plurality of known faults and whose fault root cause and the fault root cause of the target fault in the network meet the similarity condition, and send similar fault information corresponding to the target fault to the control device. The similar fault information includes an identifier of the target fault and a similar fault list. The similar fault list includes one or more similar known faults of the target fault.

Optionally, the cloud device is configured to: obtain a similarity model through training by using fault root cause features of a plurality of sample faults, and send the similarity model to the analysis device. The sample fault is marked with a category label. Sample faults marked with a same category label correspond to a same fault recovery plan. The analysis device is configured to: for each of the plurality of known faults, input the fault root cause feature of the target fault and the fault root cause feature of the known fault into a similarity model, to obtain the similarity that is between the fault root cause of the target fault and the fault root cause of the known fault and that is output by the similarity model, and determine, based on the similarities between the fault root cause of the target fault and the fault root causes of the plurality of known faults, the similar known fault that is in the plurality of known faults and whose fault root cause and the fault root cause of the target fault meet the similarity condition.

Optionally, the cloud device is further configured to send a fault root cause feature set to the analysis device. The fault root cause feature set includes correspondences between the plurality of known faults and fault root cause features. The analysis device is configured to obtain the fault root cause features of the plurality of known faults based on the fault root cause feature set.

Optionally, the similar fault information further includes a fault root cause feature of the target fault. The control device is further configured to send the identifier of the target fault and the fault root cause feature of the target fault to the cloud device. The cloud device is further configured to add the correspondence between the target fault and the fault root cause feature of the target fault to the fault root cause feature set, to obtain an updated fault root cause feature set.

A person of ordinary skill in the art may understand that all or some of the steps of embodiments may be implemented by hardware or a program instructing related hardware. The program may be stored in a computer-readable storage medium. The storage medium may be a read-only memory, a magnetic disk, an optical disc, or the like.

In embodiments of this application, the terms "first", "second", and "third" are merely used for description, but cannot be understood as an indication or implication of relative importance.

The term "and/or" in this application describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

The foregoing descriptions are only optional embodiments of this application, but are not intended to limit this application. Any modification, equivalent replacement, or improvement made within the concept and principle of this application should fall within the protection scope of this application.

What is claimed is:

1. A fault recovery plan determining method, comprising:
obtaining, by a control device, a similar known fault that is in a plurality of known faults and whose fault root cause and a fault root cause of a target fault in a network meet a similarity condition, wherein the fault root cause is represented by a fault root cause feature, the fault root cause feature comprises a fault root cause object, a fault root cause event, the fault root cause event is an abnormal event causing a fault, the fault root cause object indicates a type of a fault root cause network entity, wherein the type of a fault root cause network entity includes an interface type, a protocol type, or a service type, and the fault root cause network entity is a network entity to which the fault root cause event belongs;
obtaining, by the control device, a fault recovery plan corresponding to the similar known fault; and
determining, by the control device based on the fault recovery plan corresponding to the similar known fault, a fault recovery plan corresponding to the target fault.

2. The method according to claim 1, wherein
the fault root cause network entity is a physical interface, and the fault root cause feature further comprises one or more of an intermittent interface disconnection indication of the fault root cause network entity, an interface suspension indication of the fault root cause network entity, a packet receiving/sending state of the fault root cause network entity, an interface protocol status of the fault root cause network entity, or a physical interface status of a device in which the fault root cause network entity is located;
the fault root cause network entity is a border gateway protocol (BGP) peer, and the fault root cause feature further comprises a BGP route flapping indication of the fault root cause network entity and/or a physical interface status of a device in which the fault root cause network entity is located; or
the fault root cause feature further comprises a physical interface status of a device in which the fault root cause network entity is located.

3. The method according to claim 1, wherein the obtaining, by a control device, a similar known fault that is in a plurality of known faults and whose fault root cause and a fault root cause of a target fault in a network meet a similarity condition comprises:
obtaining, by the control device, fault root cause features of the plurality of known faults;
for each of the plurality of known faults, calculating, by the control device, a similarity between the fault root cause of the target fault and a fault root cause of the known fault based on a fault root cause feature of the target fault and the fault root cause feature of the known fault; and
determining, by the control device based on the similarities between the fault root cause of the target fault and the fault root causes of the plurality of known faults, the similar known fault that is in the plurality of known faults and whose fault root cause and the fault root cause of the target fault meet the similarity condition.

4. The method according to claim 3, wherein the calculating, by the control device, a similarity between the fault root cause of the target fault and a fault root cause of the known fault based on a fault root cause feature of the target fault and the fault root cause feature of the known fault comprises:
inputting, by the control device, the fault root cause feature of the target fault and the fault root cause feature of the known fault into a similarity model, to obtain the similarity that is between the fault root cause of the target fault and the fault root cause of the known fault and that is output by the similarity model, wherein the similarity model is obtained through training based on fault root cause features of a plurality of sample faults, the sample fault is marked with a category label, and sample faults marked with a same category label correspond to a same fault recovery plan.

5. The method according to claim 4, wherein the method further comprises:
inputting, by the control device, fault root cause features of a plurality of sample fault pairs into the similarity model in batches, to obtain a similarity that is between fault root causes of each sample fault pair and that is output by the similarity model, wherein the plurality of sample fault pairs comprise a first-category sample fault pair and a second-category sample fault pair, the first-category sample fault pair comprises two sample faults marked with a same category label, and the second-category sample fault pair comprises two sample faults marked with different category labels; and
determining, by the control device, a similarity threshold based on the similarities between the fault root causes of the plurality of sample fault pairs.

6. The method according to claim 1, wherein the determining, by the control device based on the fault recovery plan corresponding to the similar known fault, a fault recovery plan corresponding to the target fault comprises:
evaluating, by the control device based on a network configuration of the network, feasibility of the fault recovery plan corresponding to the similar known fault, wherein the network configuration comprises a networking topology and/or device data, and the device data comprises one or more of management plane data, data plane data, or control plane data; and
determining, by the control device, one or more of feasible fault recovery plans as the fault recovery plan corresponding to the target fault.

7. The method according to claim 6, wherein the determining, by the control device, one or more of feasible fault recovery plans as the fault recovery plan corresponding to the target fault comprises:
in response to a case in which a plurality of fault recovery plans are feasible, separately evaluating, by the control device based on the network configuration of the network, degrees of impact of the plurality of fault recovery plans on a service running in the network; and
determining, by the control device, a fault recovery plan that is in the plurality of fault recovery plans and that has a minimum degree of impact on the service running in the network as the fault recovery plan corresponding to the target fault.

8. The method according to claim 1, wherein the method further comprises:
determining, by the control device based on the target fault and the fault recovery plan corresponding to the target fault, a target network device of a to-be-executed plan in the network; and
sending, by the control device, a plan execution instruction to the target network device, wherein the plan execution instruction is used to instruct the target network device to execute the fault recovery plan corresponding to the target fault, and the plan execution instruction comprises the fault recovery plan corresponding to the target fault.

9. A device for determining fault recovery plan, wherein the device comprises:
at least one processor; and
at least one memory, coupled to the at least one processor and configured to store instructions that when executed by the at least one processor cause the device to:
obtain a similar known fault that is in a plurality of known faults and whose fault root cause and a fault root cause of a target fault in a network meet a similarity condition, wherein the fault root cause is represented by a fault root cause feature, the fault root cause feature comprises a fault root cause object, a fault root cause event, the fault root cause event is an abnormal event causing a fault, the fault root cause object indicates a type of a fault root cause network entity, wherein the type of a fault root cause network entity includes an interface type, a protocol type, or a service type, and the fault root cause network entity is a network entity to which the fault root cause event belongs;
obtain a fault recovery plan corresponding to the similar known fault; and
determine, based on the fault recovery plan corresponding to the similar known fault, a fault recovery plan corresponding to the target fault.

10. The device according to claim 9, wherein
the fault root cause network entity is a physical interface, and the fault root cause feature further comprises one or more of an intermittent interface disconnection indication of the fault root cause network entity, an interface suspension indication of the fault root cause network entity, a packet receiving/sending state of the fault root cause network entity, an interface protocol status of the fault root cause network entity, or a physical interface status of a device in which the fault root cause network entity is located;
the fault root cause network entity is a border gateway protocol (BGP) peer, and the fault root cause feature further comprises a BGP route flapping indication of the fault root cause network entity and/or a physical interface status of a device in which the fault root cause network entity is located; or
the fault root cause feature further comprises a physical interface status of a device in which the fault root cause network entity is located.

11. The device according to claim 9, wherein when executed by the at least one processor, the instructions further cause the device to:
obtain fault root cause features of the plurality of known faults;
for each of the plurality of known faults, calculate a similarity between the fault root cause of the target fault and a fault root cause of the known fault based on a fault root cause feature of the target fault and the fault root cause feature of the known fault; and
determine, based on the similarities between the fault root cause of the target fault and the fault root causes of the plurality of known faults, the similar known fault that is in the plurality of known faults and whose fault root cause and the fault root cause of the target fault meet the similarity condition.

12. The device according to claim 11, wherein when executed by the at least one processor, the instructions further cause the device to:
input the fault root cause feature of the target fault and the fault root cause feature of the known fault into a similarity model, to obtain the similarity that is between the fault root cause of the target fault and the fault root cause of the known fault and that is output by the similarity model, wherein the similarity model is obtained through training based on fault root cause features of a plurality of sample faults, the sample fault is marked with a category label, and sample faults marked with a same category label correspond to a same fault recovery plan.

13. The device according to claim 12, wherein when executed by the at least one processor, the instructions further cause the device to:

input fault root cause features of a plurality of sample fault pairs into the similarity model in batches, to obtain a similarity that is between fault root causes of each sample fault pair and that is output by the similarity model, wherein the plurality of sample fault pairs comprise a first-category sample fault pair and a second-category sample fault pair, the first-category sample fault pair comprises two sample faults marked with a same category label, and the second-category sample fault pair comprises two sample faults marked with different category labels; and determine a similarity threshold based on the similarities between the fault root causes of the plurality of sample fault pairs.

14. The device according to claim 9, wherein when executed by the at least one processor, the instructions further cause the device to:

evaluate, based on a network configuration of the network, feasibility of the fault recovery plan corresponding to the similar known fault, wherein the network configuration comprises a networking topology and/or device data, and the device data comprises one or more of management plane data, data plane data, or control plane data; and determine one or more of feasible fault recovery plans as the fault recovery plan corresponding to the target fault.

15. The device according to claim 14, wherein when executed by the at least one processor, the instructions further cause the device to:

in response to a case in which a plurality of fault recovery plans are feasible, separately evaluate, based on the network configuration of the network, degrees of impact of the plurality of fault recovery plans on a service running in the network; and determine, a fault recovery plan that is in the plurality of fault recovery plans and that has a minimum degree of impact on the service running in the network as the fault recovery plan corresponding to the target fault.

16. The device according to claim 9, wherein when executed by the at least one processor, the instructions further cause the device to:

determine, based on the target fault and the fault recovery plan corresponding to the target fault, a target network device of a to-be-executed plan in the network; and send a plan execution instruction to the target network device, wherein the plan execution instruction is used to instruct the target network device to execute the fault recovery plan corresponding to the target fault, and the plan execution instruction comprises the fault recovery plan corresponding to the target fault.

17. One or more non-transitory computer-readable media storing computer instructions, that when executed by one or more processors, cause a computing device to perform operations comprising:

obtaining a similar known fault that is in a plurality of known faults and whose fault root cause and a fault root cause of a target fault in a network meet a similarity condition, wherein the fault root cause is represented by a fault root cause feature, the fault root cause feature comprises a fault root cause object, a fault root cause event, the fault root cause event is an abnormal event causing a fault, the fault root cause object indicates a type of a fault root cause network entity, wherein the type of a fault root cause network entity includes an interface type, a protocol type, or a service type, and the fault root cause network entity is a network entity to which the fault root cause event belongs;

obtaining a fault recovery plan corresponding to the similar known fault; and determining, based on the fault recovery plan corresponding to the similar known fault, a fault recovery plan corresponding to the target fault.

* * * * *